(12) United States Patent
Diorio et al.

(10) Patent No.: US 10,916,114 B1
(45) Date of Patent: Feb. 9, 2021

(54) EXIT-CODE-BASED RFID LOSS-PREVENTION SYSTEM

(71) Applicant: Impinj, Inc., Seattle, WA (US)

(72) Inventors: Christopher J. Diorio, Shoreline, WA (US); Scott A. Cooper, Seattle, WA (US); Matthew Robshaw, Seattle, WA (US); Tan Mau Wu, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/826,470

(22) Filed: Mar. 23, 2020

Related U.S. Application Data

(63) Continuation of application No. 16/251,698, filed on Jan. 18, 2019, now Pat. No. 10,600,298, which is a continuation of application No. 15/600,454, filed on May 19, 2017, now Pat. No. 10,186,127, which is a continuation of application No. 14/879,161, filed on Oct. 9, 2015, now Pat. No. 9,691,243, which is a continuation of application No. 14/162,745, filed on Jan. 24, 2014, now Pat. No. 9,189,904, which is a continuation-in-part of application No. 13/972,825, filed on Aug. 21, 2013, now Pat. No. 8,866,596.
(Continued)

(51) Int. Cl.
| | |
|---|---|
| *G08B 13/24* | (2006.01) |
| *G06K 7/10* | (2006.01) |
| *G07C 9/28* | (2020.01) |
| *G07C 9/20* | (2020.01) |

(52) U.S. Cl.
CPC ..... *G08B 13/2454* (2013.01); *G06K 7/10366* (2013.01); *G07C 9/20* (2020.01); *G07C 9/28* (2020.01); *H04Q 2213/13095* (2013.01)

(58) Field of Classification Search
CPC combination set(s) only.
See application file for complete search history.

(56) References Cited

U.S. PATENT DOCUMENTS

| | | |
|---|---|---|
| 5,528,222 A | 6/1996 | Moskowitz et al. |
| 6,114,962 A | 9/2000 | Wiklof et al. |
| (Continued) | | |

OTHER PUBLICATIONS

Final Office Action received for U.S. Appl. No. 13/969,198, dated Jun. 11, 2014 and filed Aug. 16, 2013.
(Continued)

*Primary Examiner* — Travis R Hunnings
(74) *Attorney, Agent, or Firm* — Hertzberg, Turk, & Associates, LLC

(57) ABSTRACT

Methods and systems are described for authorizing an item with an RFID tag to leave a facility. In one embodiment, a mobile device receives or determines an exit code (EC) to write into the tag in response to providing authorizing information. The EC may be based on information stored in the tag such as the tag's item identifier or other tag information (collectively an item identifier or II), a ticket value, other information such as the OC, a mobile identity or location, or any other suitable information. Upon verification of the EC, the tagged item is allowed to leave the facility. In another embodiment, the mobile device stores an item identifier (II) associated with the tag and provides authorizing information. Upon verifying the authorizing information and confirming that the stored II corresponds to the tagged item's II, the tagged item is allowed to leave the facility.

20 Claims, 15 Drawing Sheets

Related U.S. Application Data which is a continuation-in-part of application No. 12/890,628, filed on Sep. 25, 2010, now Pat. No. 8,593,257.

(60) Provisional application No. 61/354,659, filed on Jun. 14, 2010.

(56) References Cited

U.S. PATENT DOCUMENTS

| | | |
|---|---|---|
| 6,147,662 A | 11/2000 | Grabau et al. |
| 7,327,216 B2 | 2/2008 | Ghabra et al. |
| 7,800,499 B2 | 9/2010 | Rehman |
| 8,866,595 B1 | 10/2014 | Diorio et al. |
| 8,866,596 B1 | 10/2014 | Diorio et al. |
| 8,872,636 B1 | 10/2014 | Diorio et al. |
| 9,189,904 B1 | 11/2015 | Diorio et al. |
| 10,186,127 B1 * | 1/2019 | Diorio ............... G08B 13/2454 |
| 2006/0181397 A1 * | 8/2006 | Limbachiya ........... G06K 17/00 340/10.51 |
| 2006/0230276 A1 | 10/2006 | Nochta |
| 2008/0106372 A1 * | 5/2008 | Chang ............... G06Q 30/0603 340/5.8 |
| 2008/0150702 A1 | 6/2008 | Neill et al. |
| 2009/0160615 A1 | 6/2009 | O'Brien et al. |
| 2010/0308978 A1 | 12/2010 | Brown |
| 2011/0169639 A1 | 7/2011 | Manske |
| 2011/0175710 A1 | 7/2011 | Lamp |
| 2013/0278388 A1 | 10/2013 | Cristache |

OTHER PUBLICATIONS

Office Action received for U.S. Appl. No. 13/972,825, dated Jun. 4, 2014 and filed Aug. 21, 2013.

* cited by examiner

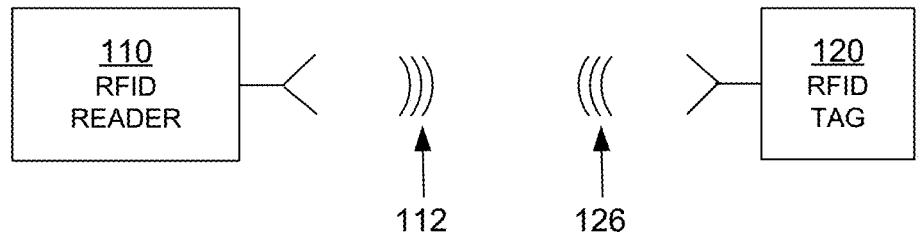
FIG. 1
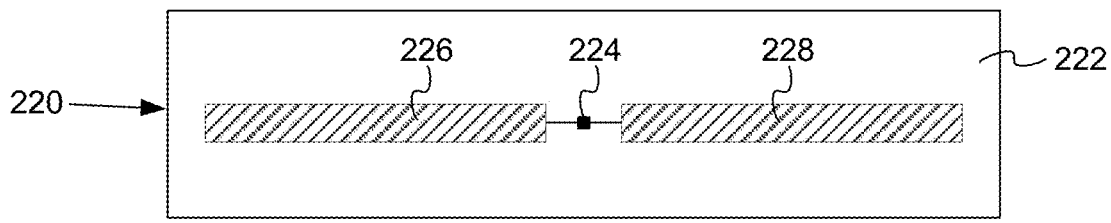
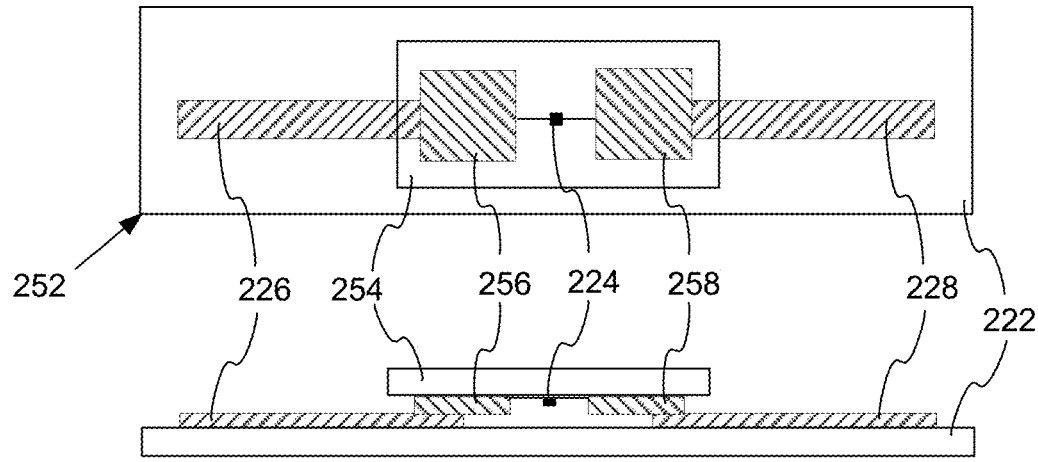
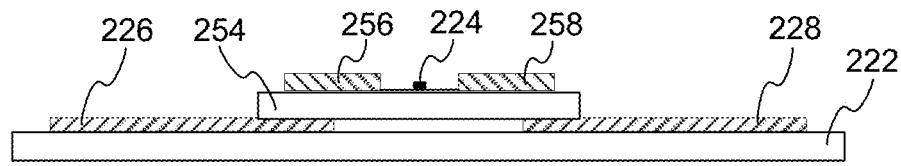
FIG. 2

*RFID READER CONFIGURATION WITH OPTIONAL LOCAL AND REMOTE COMPONENTS*

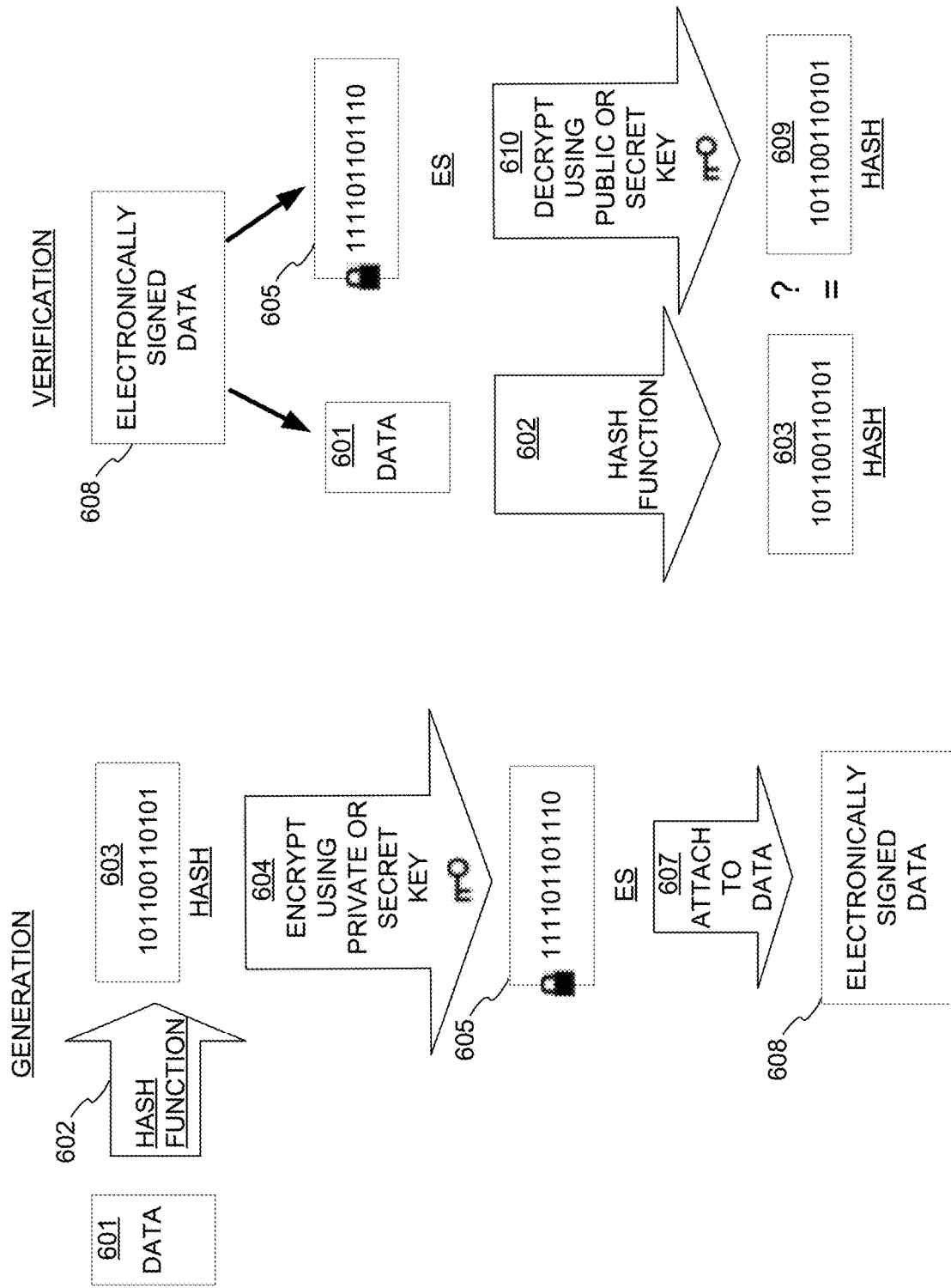

EXIT-CODE-BASED RFID LOSS-PREVENTION SYSTEM

CROSS REFERENCE TO RELATED APPLICATIONS

This application is a continuation of U.S. application Ser. No. 16/251,698 filed on Jan. 18, 2019, which is a continuation under 35 U.S.C. § 120 of U.S. patent application Ser. No. 15/600,454 filed on May 19, 2017, now U.S. Pat. No. 10,186,127, which is a continuation under 35 U.S.C. § 120 of U.S. patent application Ser. No. 14/879,161 filed on Oct. 9, 2015, now U.S. Pat. No. 9,691,243, which is a continuation under 35 U.S.C. § 120 of U.S. patent application Ser. No. 14/162,745 filed on Jan. 24, 2014, now U.S. Pat. No. 9,189,904, which is a continuation-in-part under 35 U.S.C. § 120 of U.S. patent application Ser. No. 13/972,825 filed on Aug. 21, 2013, now U.S. Pat. No. 8,866,596, which is a continuation under 35 U.S.C. § 120 of U.S. patent application Ser. No. 12/890,628 filed on Sep. 25, 2010, now U.S. Pat. No. 8,593,257, which claims the benefit of U.S. Provisional Patent Application Ser. No. 61/354,659 filed on Jun. 14, 2010. The disclosures of parent applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

RFID technology may be employed in loss-prevention systems used, for example, by retailers. Verification readers read tagged items exiting the store and determine if the item is approved to leave. However, the determination can be challenging. In one approach, a store database maintains information about all items in the store, and indicates if an item is approved to leave. The verification reader then checks the database for approval. Unfortunately, implementing the database may be costly and/or complex, especially for large stores that contain a large number of items, multiple entrances and exits, and multiple Point-of-Sale or checkout registers (collectively, PoS) that must continually update the database.

In another approach, the tags themselves retain information about whether they are approved to leave the store, and the verification reader checks each tag for approval. Authorization readers or consumer mobile devices may write a bit or bits to each tag indicating that the item is approved to leave. Unfortunately, this approach is susceptible to thieves using unauthorized readers to illegitimately set the bit or bits, typically necessitating a password-based authorization system that is complicated to maintain and use and is itself susceptible to attack.

Finally, for both approaches, foreign tags entering a store (such as a tag carried by a consumer on his or her person) may further complicate the situation because the verification reader must determine if a departing item is foreign or stolen.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID systems for loss prevention. An ownership code (OC) associated with an organization or facility is stored in a tag, indicating that an item to which the tag is attached is associated with the facility and not foreign (a foreign tag indicates an item not associated with the facility). In one embodiment, an authorization reader writes an exit code (EC) into the tag to indicate that the tagged item is allowed to leave the facility. The EC may be based on information stored in the tag such as the tag's item identifier or other tag information (collectively an item identifier or II), a ticket value, other information such as the OC, an authorization reader identity or location, or any other suitable information. In some embodiments the authorization reader is a consumer device such as a mobile phone.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 6A is a flow diagram illustrating generating and writing an electronic signature.

FIG. 6B is a flow diagram illustrating verifying an electronic signature.

DETAILED DESCRIPTION

Figure 3:
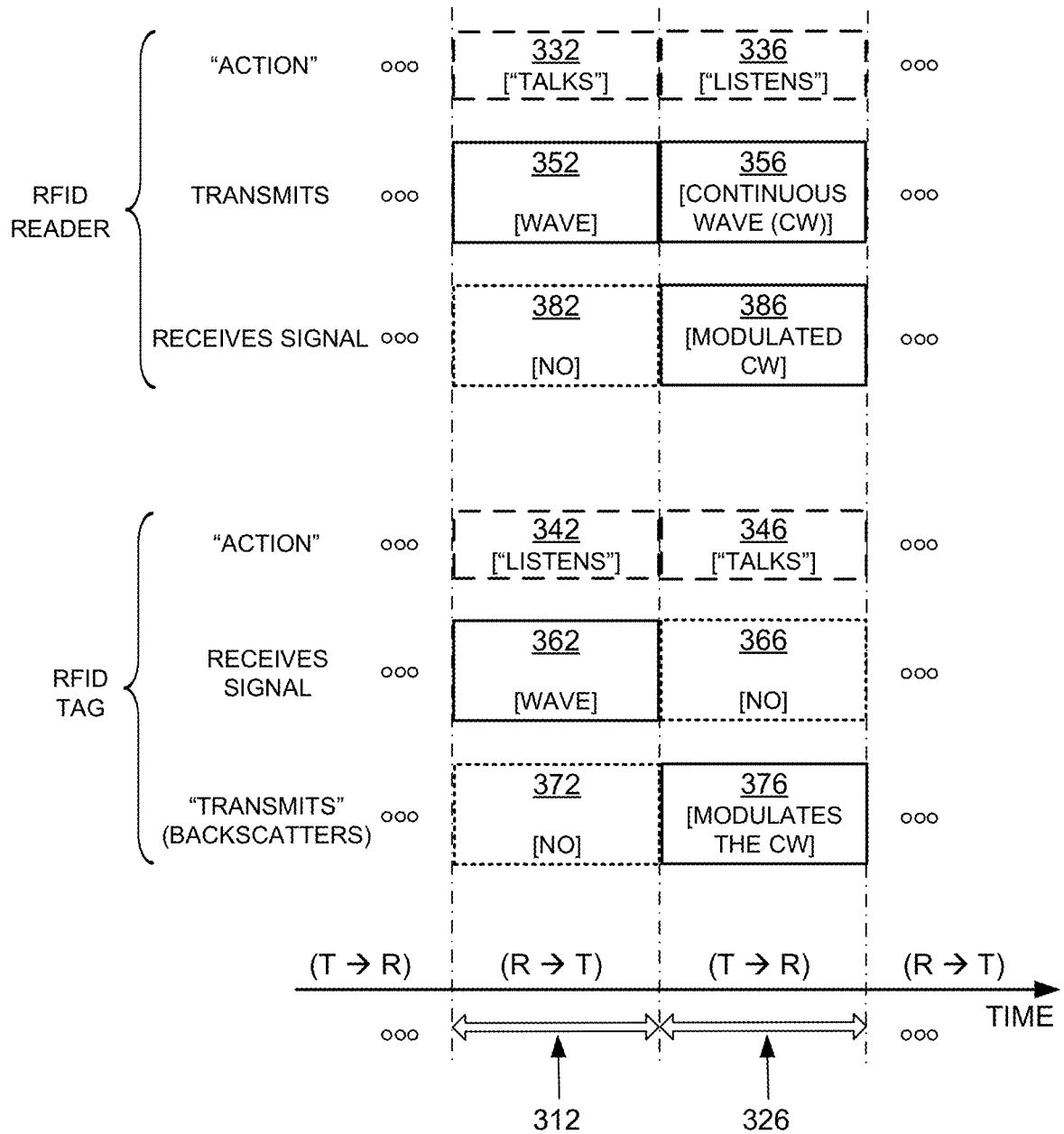
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the antenna contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
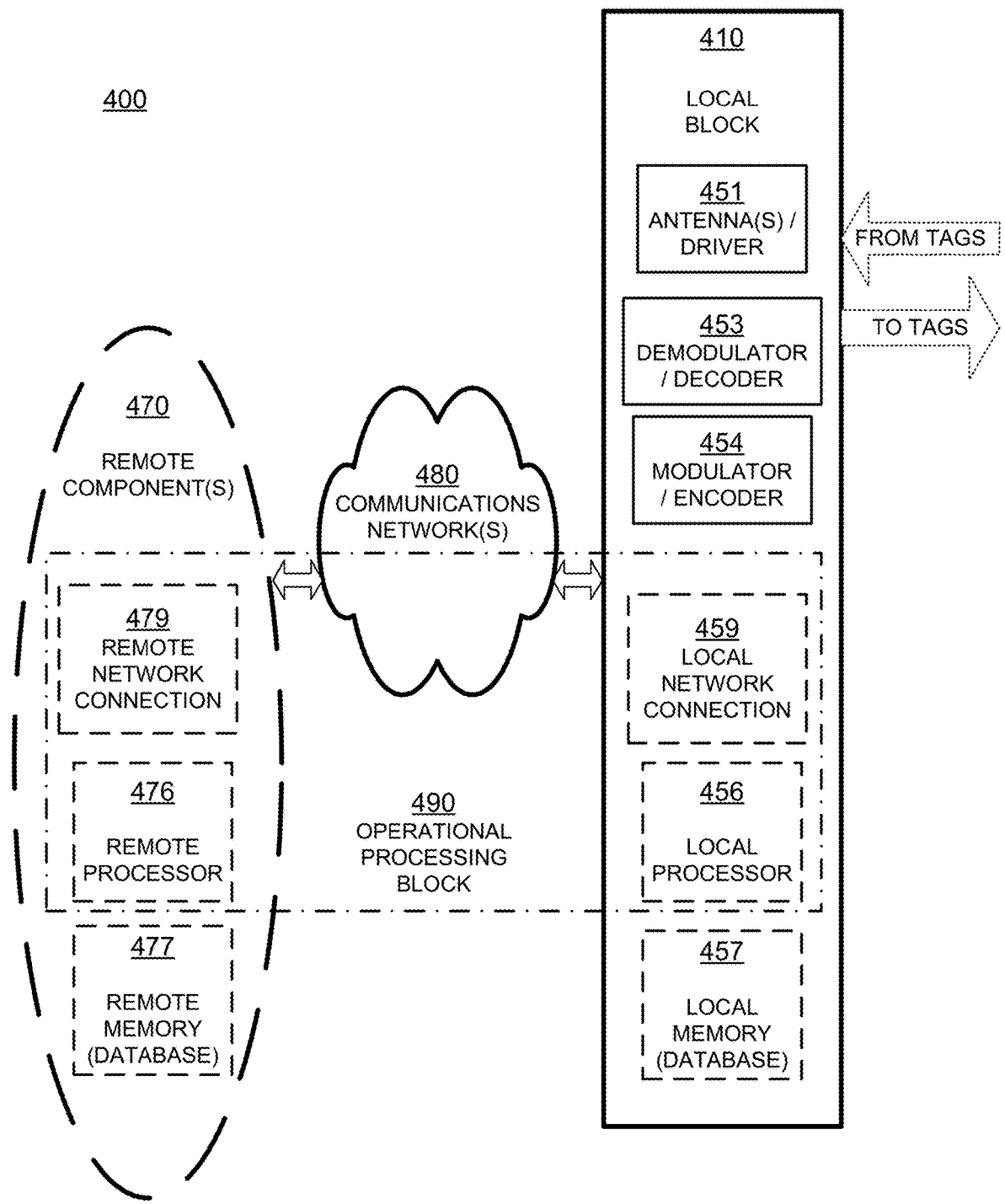
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with tags. Local block 410 includes a block 451 of an antenna and an antenna driver for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 453 demodulates and decodes waves received from the tags via antenna/driver block 451. Modulator/encoder block 454 encodes and modulates RF waves that are to be transmitted to tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authorization function; in some cases one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Memory 457 can be implemented separately from local processor 456, or in an IC with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) exit codes (ECs), ownership codes (OCs), and other data. Local memory 457 can also include reference data that is to be compared to the EPC, instructions and/or rules for how to encode commands for the tags, modes for controlling antenna 451, secret keys, key pairs, and so on. In some of these embodiments, local memory 457 is provided as a database.

Some components of local block 410 typically treat data as analog, such as antenna/driver block 451. Other components such as local memory 457 typically treat data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link such as a USB, PCI, and so on. Local block 410 may include a local network connection 459 for communicating with network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, via other networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an encryption function, similar to local processor 456.

Remote component(s) 470 can also include a remote memory 477. Remote memory 477 can be made in any way known in the art, such as was described with reference to local memory 457. Remote memory 477 may include a local database or a database of a Standards Organization, such as one that can reference EPCs. Remote memory 477 may also contain information associated with command, tag profiles, keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
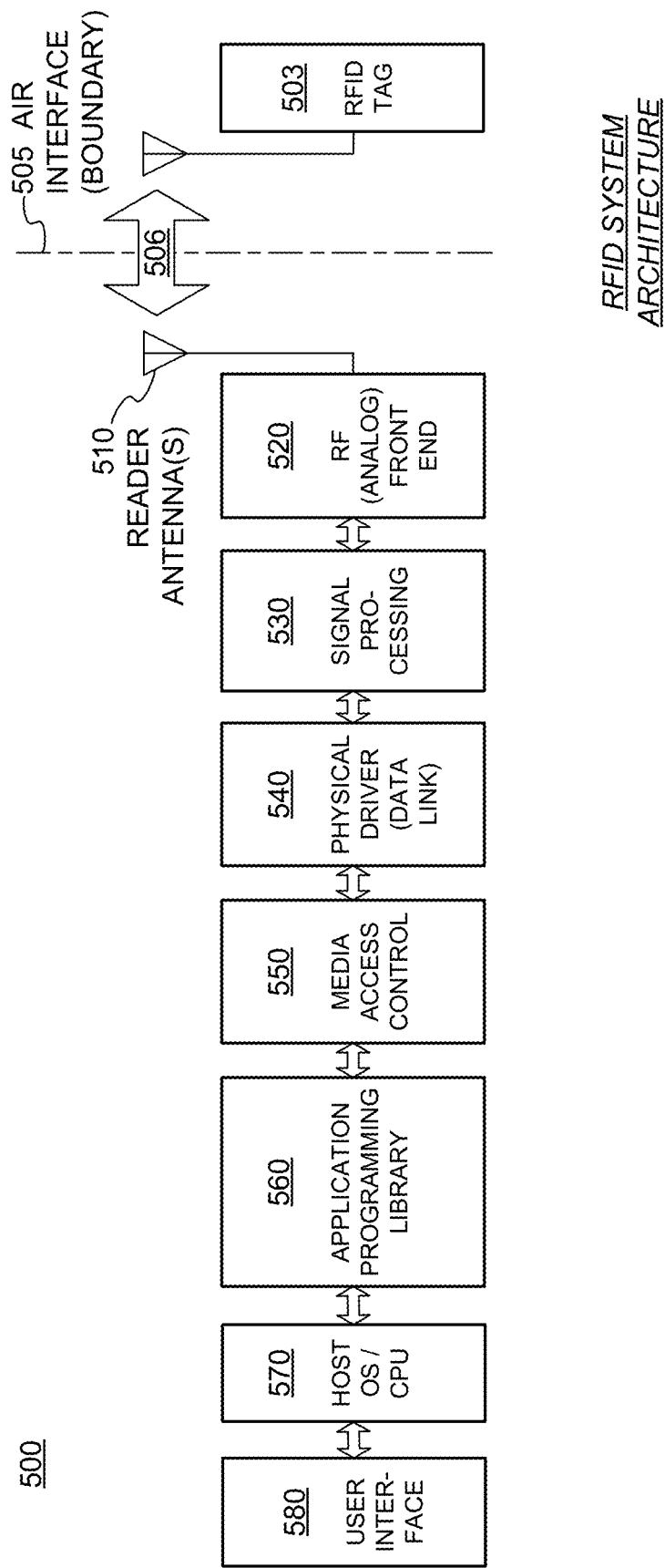
FIG. 5 is a block diagram illustrating an overall architecture of an RFID system according to embodiments.

FIG. 5 is a block diagram illustrating an architecture of an RFID reader 500 according to embodiments. For reasons of clarity, RFID reader 500 is subdivided into modules or components. Each of these modules may be implemented by itself, or in combination with others. In addition, some of them may be present more than once. Other embodiments may be equivalently subdivided into different modules. It will be recognized that some aspects of FIG. 5 are parallel with those described previously.

RFID tag 503 is considered here as a module by itself. RFID tag 503 conducts a wireless communication 506 with the remainder, via air interface 505. Air interface 505 is really a boundary, in that signals or data that pass through it are not intended to be transformed from one thing to another. Specifications as to how readers and tags are to communicate with each other, for example the Gen 2 Specification, also properly characterize that interface as a boundary.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550. In one embodiment, module 550 exchanges packets of bits with physical driver module 540. Module 550 can make decisions for sharing the communication medium, which in this case is the air interface but in other embodiments could be a wired interface.

RFID system 500 moreover includes an application-programming library-module 560, which can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with calculating and/or writing an ownership code and/or an electronic signature as part of a loss-prevention or self-checkout system.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to interconnect modules that are physically close to each other, or over a network, for remote communication.

The chain is used in one direction for receiving RFID waveforms and in the other for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them. In some embodiments RFID system 500 can be incorporated into another electronic device such as a point-of-sale terminal in a retail facility or a consumer device such as a mobile phone.

As mentioned previously, embodiments are directed to employing RFID readers and tags in a loss-prevention system. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and may be read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

As described above, an authorization reader may authorize a tag and its associated item to leave a facility by writing an exit code (EC) to the tag. A "code" as used herein is a numerical value that may be expressed as a single- or multi-bit value in a binary, octal, hexadecimal, decimal, or any other suitable format. The authorization reader may compute the EC using an algorithm with one or more inputs. The algorithm may include one or more arithmetic operations, logical operations, bit-shifting operations, truncation operations (i.e., operations that reduce the bit length of a code, for example by discarding bits), extension operations (i.e., operations that increase the length of a code, for example by padding or concatenation), and/or any other suitable operations. The inputs may include identifiers such as an II, the OC, reader identifier(s), or any other suitable parameters, where an II is a TID, an EPC, a unique item identifier (UII), a serialized global trade item number (SGTIN), a combination of these numbers, a number derived from any of these numbers, or any other number that allows identifying the individual tag or item to which the tag is attached. The OC identifies the facility, a parent of the facility, an organization associated with the facility, a manufacturer, a retail seller, or any other entity with which the tag or item is associated or owned.

In some embodiments, an authorization reader uses a cryptographic algorithm to compute the exit code. In this case, the exit code is known as a "electronic signature" or "ES". Electronic signatures allow the authenticity and integrity of a digital message to be verified. FIGS. 6A and 6B are flow diagrams illustrating generating and verifying an ES.

An ES may be a digital signature or a message authentication code. The term "electronic signature" or "ES" as used herein may refer to a digital signature, a message authentication code, a hash, or another output from a cryptographic algorithm, as well as to truncated, shortened, concatenated, padded, or arithmetically modified versions of the preceding.

Digital signatures are typically referred to in the context of asymmetric cryptography. A signatory, also referred to as a sender, possesses a private/public key pair where the private and public keys are mathematically related to each other. The sender uses the private key to generate the digital signature. A recipient uses the sender's public key to verify the digital signature. A verified digital signature gives the recipient reason to believe that the message was created by a known sender, and that it was not altered.

A message authentication code is the digital-signature equivalent in the context of symmetric cryptography. A signatory, also referred to as a sender, possesses a secret key and the sender uses the secret key to generate the message authentication code. A recipient can use the same secret key to verify the message authentication code. A verified message authentication code gives the recipient reason to believe that the message was created by a known sender, and that it was not altered.

FIG. 6A is a flow diagram illustrating a method for generating an ES. The method described in FIG. 6A is also known as a digital signature with appendix when asymmetric cryptography is used. A hash value 603 is derived from data 601 and hash function 602. The hash value 603 is encrypted using a private (for asymmetric cryptography) or secret (for symmetric cryptography) key (604). The encrypted hash value is the ES 605. The ES 605 is attached to the data 601 to form electronically signed data 608. In some embodiments, particularly those with limited memory, only a portion of the ES may be attached to the data 601. This partial ES may only allow partial or reduced-security verification, but in some applications this partial verification may still provide adequate security.

FIG. 6B is a flow diagram illustrating a method for verifying an ES. The electronically signed data 608 is split into two components, data 601 and ES 605. The hash value 603 is derived from data 601 and hash function 602. The ES 605 is decrypted using a public (for asymmetric cryptography) or secret (for symmetric cryptography) key (610) to form decrypted hash 609. The hash value 603 is compared with the decrypted hash value 609. If the hash value 603 is equal to the decrypted hash value 609 then the ES 605 is considered verified. A verified ES provides assurance that the data 601 was signed by the known sender and that the data has not been altered. For a partial ES, the verification may contain ambiguity or uncertainty, but as described above this uncertainty may still be acceptable to the application.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

In some embodiments, electronic signatures may be generated without using a separate hash, using a signature scheme with message recovery. In such embodiments, ES 605 may be generated directly from data 601, and digitally signed data 608 only includes ES 605. During verification, the ES 605 is directly decrypted to provide data 601. Of course, other electronic signature schemes may be used.

Figure 7A:
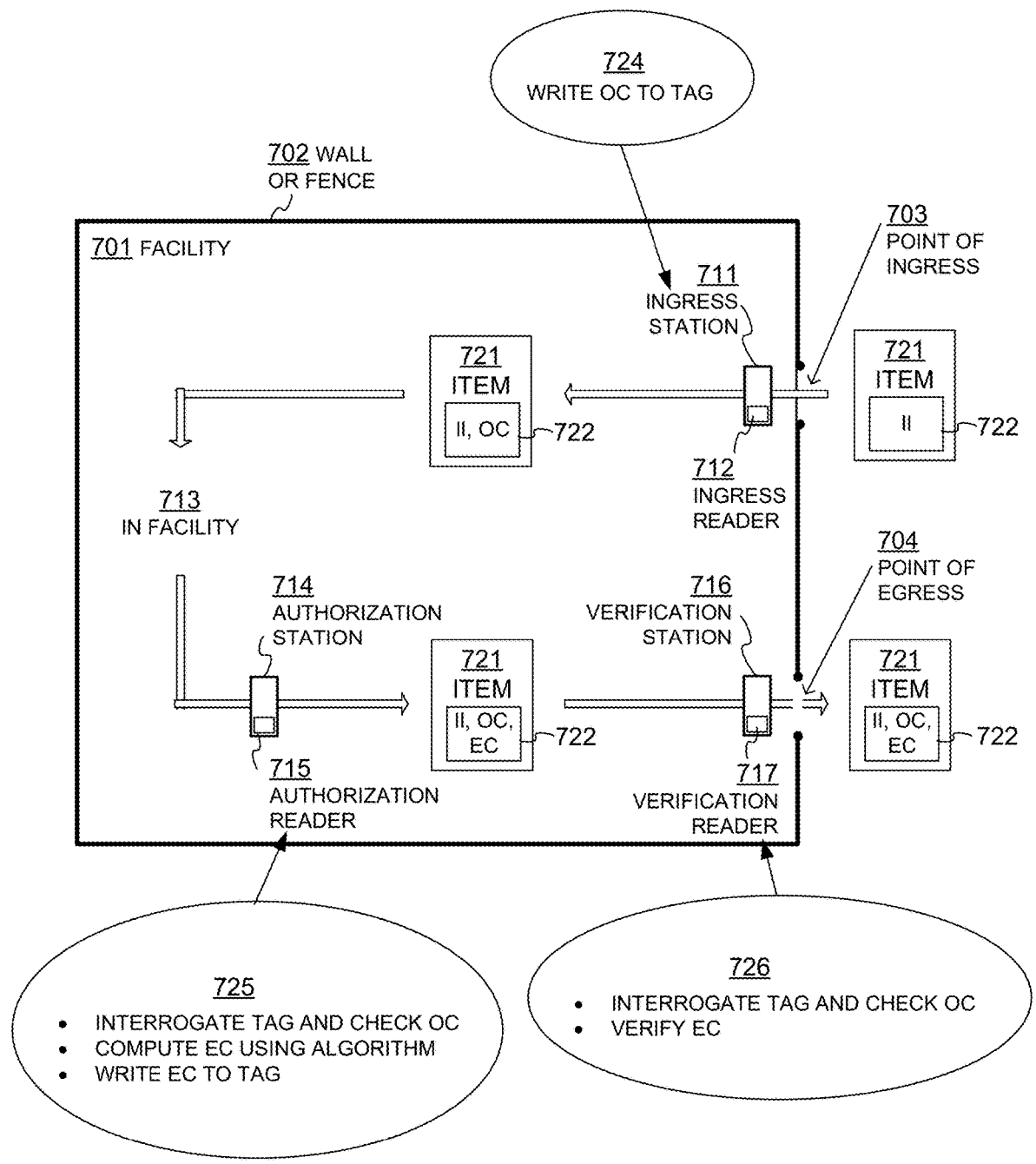
FIGS. 7A-7D are conceptual diagrams displaying authorization and exit verification according to embodiments.

FIG. 7A is a conceptual diagram illustrating an example RFID-based loss-prevention system. Facility 701 may be a building, yard, retail store, laboratory, warehouse, construction facility, plant, military base, airport, ship, parking lot, shipping container, portion or section of the above, a location within or associated with one of the above, or similar. Facility 701 is typically enclosed by a wall, border, or fence 702. An RFID-based loss-prevention system according to embodiments restricts unauthorized items from leaving facility 701 while allowing foreign items (items not owned by the facility) to be brought in and removed freely.

Item 721 is typically delivered to facility 701 with a tag 722 having a preprogrammed II. In some embodiments tag 722 may arrive pre-preprogrammed with both an II and an OC. In other embodiments item 721 may be delivered without tag 722, and a tag 722 is programmed with an II and an OC and attached to item 721 in the facility. In yet other embodiments item 721 may be delivered with a blank, unprogrammed, or partially programmed tag 722, leaving the II and/or the OC to be programmed within the facility. Regardless of the tagging approach, item 721 enters point-of-ingress 703. An optional ingress station 711 including an ingress reader 712 reads tag 722 and, if the tag is lacking an II or OC, writes them into the tag at operation 724. Note that ingress station 711 can be located anywhere in facility 701; can be outside the facility; can be a separate facility which performs tag encoding, or could even be a mobile reader such as a handheld device. In some embodiments, separate readers may be used to write the II and the OC into the tag. A reader may check to see if the tag lacks an II or OC before writing, or may write the II/OC without checking. Regardless of the methodology, after ingress and encoding the tagged item, containing an II and OC, will be at location 713 in the facility.

Items must be authorized to leave facility 701. The authorization process is performed at authorization station 714 using authorization reader 715. As described in process 725, authorization reader 715 interrogates tag 722 attached to item 721, confirms that the OC is associated with facility 701, computes an exit code EC using an algorithm, and writes the EC into the tag. The EC may be, may include, or may be a computed result based on, an ES, a ticket (as described below), an II, and/or other information including but not limited to a location, a timestamp, a device identity, customer information, authorization information (as described below), an OC, or any other parameter. A tag 722 with a verified EC is authorized to leave facility 701. Authorization reader 715 may write the EC into tag 722 authorizing it to leave the facility in response to receiving and verifying authorizing information. Authorizing information is provided by an entity wishing to remove tag 722 and its associated item from facility 701. Authorizing information may include identification information, account information, payment authorization, payment data (e.g., electronic currency or electronic gift card balance), credit-limit information, proof-of-payment, an employee number, item transportation information, a security code, a legal warrant, or any other information suitable for an authorizing entity (authorization reader 715 or another authorizing entity) to determine whether tag 722 and its associated item should be authorized to leave facility 701. An authorizing entity, upon receiving authorizing information, attempts to verify the authorizing information. If the authorizing information is verified then the authorizing entity may provide the EC, may allow authorization reader 715 to generate the EC, or may allow authorization reader 715 to provide the EC.

In some embodiments, the EC written to the tag may be an abridged multibit code formed from an original, longer code, where the abridging comprises at least one of truncating, compressing, selecting certain bits from, and/or otherwise reducing the longer code. For example, the EC may be an abridged version of an original ES formed by truncating the original ES, compressing the original ES, and/or selecting a subset of bits from the original ES. In some embodiments, an abridging algorithm may be specific to a particular tag, a particular group of tags, a facility (e.g., facility 701), or any particular entity. In other embodiments, the abridging algorithm may be generally used for RFID tags. Authorization reader 715 may write an abridged code into the tag if, for example, the tag does not have sufficient memory (or does not have sufficient tag memory space allocated) for the original code. In some embodiments, authorization reader 715 may write an abridged code to speed up the write process. In other embodiments, the abridged code may be generated based on an authentication mechanism. For example, the tag may store an identifier identifying how the abridged code was abridged (e.g., whether via truncation, compression, selection of a subset of bits, etc., and if via truncation or selection of bits, which portion or bits of the longer code was truncated or kept), and subsequent readers (e.g., verification reader 717 below) may use the stored portion identifier to authenticate the abridged code.

At or near the facility point-of-egress 704, a point-of-exit (or PoE) verification reader 717 located at verification station 716 interrogates the tag and reads its OC, EC, and optionally its II. As will be described in connection with FIG. 13, in some embodiments the II can function as an OC, in which case verification reader 717 will read the II as a surrogate for the OC. As described at operation 726, verification reader 717 checks the tag's OC and if the item is associated with the facility then verifies the EC. In some embodiments, verification reader 717 knows the algorithm and inputs used to compute the EC and verifies the EC by computing a verification value with the algorithm and inputs and comparing the verification value with the EC. If the EC is abridged, verification reader 717 may compute the verification value, determine the abridging algorithm used to form the EC (e.g., whether the abridging algorithm includes truncation, compression, selection of a subset of bits, etc.), derive an abridged verification value corresponding to the EC, and compare the abridged verification value to the EC. Verification reader 717 may determine the abridging algorithm based on information stored in the tag (as described above), information stored at verification reader 717, or using information available over a network. In other embodiments, verification reader 717 may use the EC in a reverse computation. For example, verification reader 717 may reverse the algorithm (or know the reversed algorithm) and use the reversed algorithm to compute the initial inputs given the EC. If verification reader 717 knows what the correct initial inputs should be, it can compare the computed initial inputs with the correct initial inputs to verify the EC.

In embodiments where the EC includes an ES, verification reader 717 may verify the ES using the facility's secret for symmetric cryptosystems or using the facility's public key for asymmetric cryptosystems. For situations where the EC includes an abridged version of an original ES and verification reader 717 knows the cryptographic algorithm and inputs used to compute the original ES, verification reader 717 may determine the abridging algorithm used to form the EC (as described above), compute a verification ES, derive an abridged verification ES corresponding to the EC from the verification ES based on the abridging algorithm, and compare the abridged verification ES to the EC.

If verification reader 717 verifies the EC then item 721 may be permitted to be removed through point of egress 704. If the EC is not verified then verification station 716 may sound an alarm or otherwise notify authorities that an unauthorized item is departing the facility. Points of ingress and egress 703 and 704 may include doors, doorways, hallways, ramps, garages, and similar.

In some embodiments, the EC may also (or instead) include or be based on one-time-use codes (referred to as "tickets"). A ticket encodes information known to both an authorization reader (e.g., authorization reader 715) and a verification reader (e.g., verification reader 717), and is used by an authorization reader to indicate to a verification reader that a particular item or tag is authorized to leave the facility. Tickets are multi-bit values (i.e., include more than one bit). Tickets may be random numbers, generated for example by a random or pseudorandom number generator; they may also be deterministic numbers generated by any type of number-generating algorithm as will be known to those skilled in the art. Ticket-generating algorithms may use as inputs a location, a timestamp, a device identity, an II, an OC, or any other input. In some embodiments, a cryptographic algorithm may generate the ticket.

Figure 7B:
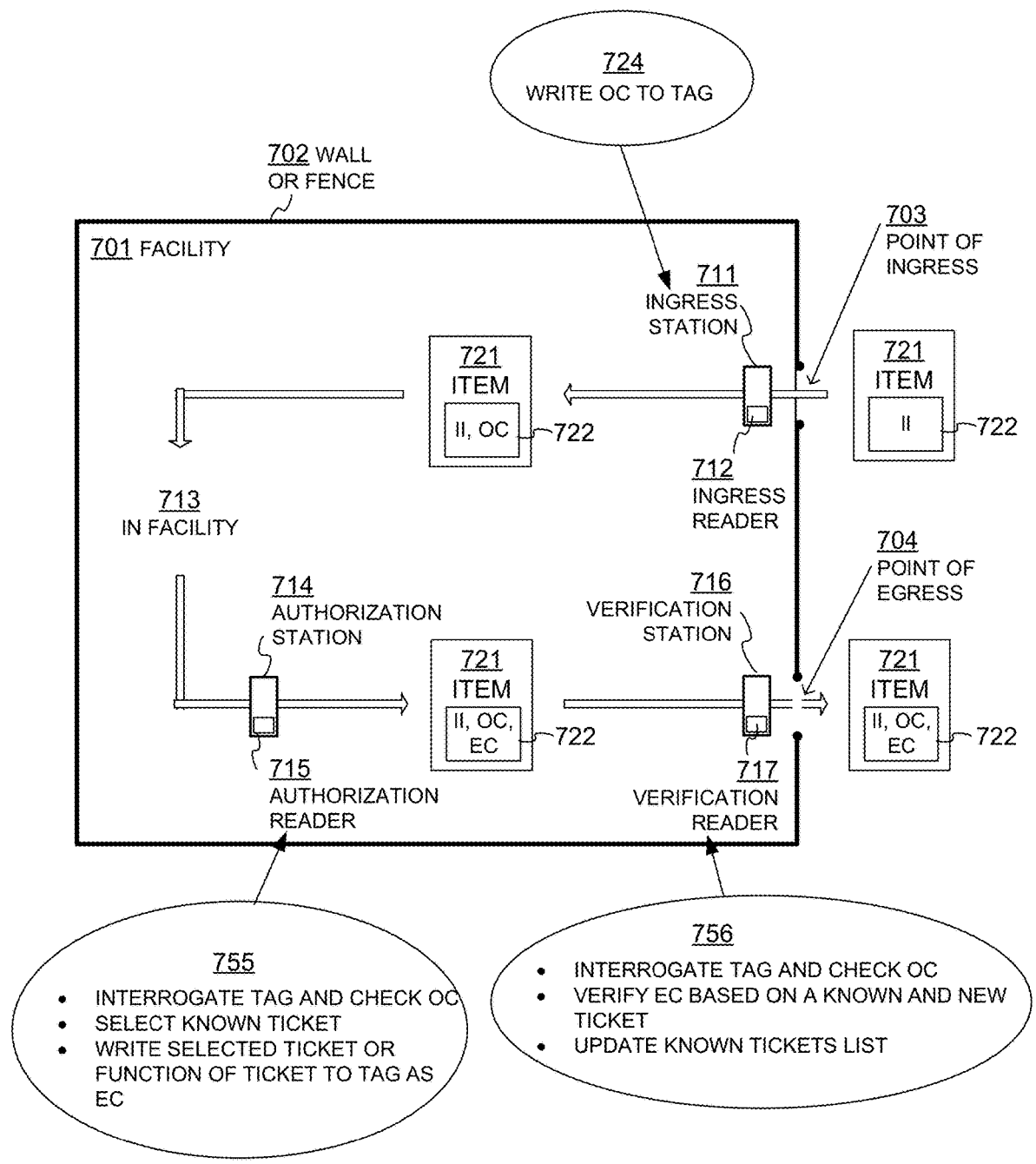

FIG. 7B is another conceptual diagram displaying authorization and exit verification. FIG. 7B is similar to FIG. 7A, with similarly-numbered elements behaving similarly. Unlike FIG. 7A, when authorization reader 715 in FIG. 7B determines at operation 755 that item 721 and attached tag 722 are authorized to leave facility 701, it selects and assigns a ticket to tag 722. It then uses the selected ticket to generate an EC to write to tag 722, such as by writing the ticket or an abridged portion of the ticket as the EC, or by using a function or algorithm to derive a result from the ticket and writing the result or an abridged portion of the result as the EC. The process for generating an abridged portion is similar to the process for generating an abridged EC and may include at least one of truncating, compressing, selecting bits from, and/or otherwise reducing a longer ticket or result. The abridging algorithm may be specific to a particular tag, a particular group of tags, a facility (e.g., facility 701), any particular entity, or RFID tags in general.

As mentioned above, tickets are one-time-use codes. After authorization reader 715 assigns the selected ticket to tag 722 (and writes an EC based on the ticket to tag 722), it does not use the ticket again. To prevent reuse, authorization reader 715 may dispose of the selected ticket by deleting the ticket from its memory, flagging the ticket in memory as "used", associating an identifier (e.g., an authorization reader identifier or an II) with the ticket in reader memory, or otherwise indicating that that selected ticket has been used. As a result, each tag authorized to leave facility 701 should be assigned a different ticket. Of course, depending on the ticket length (number of bits or words) and number of items exiting the facility, the system may eventually run out of tickets and start reusing previously-used tickets, but loss-prevention systems will typically attempt to maintain ticket uniqueness at least for a reasonable period of time.

In operation 756 at point-of-egress 704, verification reader 717 confirms the OC, reads the EC, and optionally reads the II stored on tag 722. Confirming the OC may involve selecting only tags with the facility OC for inventorying/reading, or may involve inventorying all tags and ignoring/rejecting tags with an OC that is improper for the facility. Verification reader 717 knows the tickets that authorization reader 715 knows, and can confirm whether the EC stored on tag 722 includes, is, or is derived from a valid ticket (and therefore was presumably written by authorization reader 715). Moreover, verification reader 717 can determine if the EC stored on tag 722 is new (i.e., not previously read by a verification reader) or was previously observed by it or by another verification reader (the latter may be another, networked verification reader at a different facility point-of-egress). If the EC stored on tag 722 is new then verification reader 717 may assume that tag 722 is authorized to leave the facility (i.e., that authorization reader 715 authorized the tag to leave by storing the EC on the tag) and allows tag 722 and item 721 to leave facility 701. Verification reader 717 then updates the list of tickets to indicate that the ticket assigned to tag 722 has been used, and may additionally associate the ticket with one or more identifiers including the II, the OC, and/or identifier(s) of the verification reader, authorization reader, or the facility. Verification reader 717 may also share the updated ticket list with a networked device such as other verification readers of the facility.

Subsequently, if verification reader 717 sees a previously-read ticket assigned to the previously-read tag then it may assume that the tagged item is reentering the facility (such as for a product return) and allow the tag to pass the point-of-egress. However, if it sees a previously-read ticket assigned to a different tag then it may assume that an attacker is trying to remove unauthorized items from facility 701 and may sound an alarm or otherwise notify authorities. As described above, the ticket may be an EC or may be derivable from the EC. Similarly, if an unknown EC is stored on tag 722, or if no EC or an otherwise invalid EC is stored on tag 722, then verification reader 717 may also sound an alarm or otherwise notify authorities. Finally, the reader may ascertain that a tag has been previously read using the tag's II.

Figure 7C:
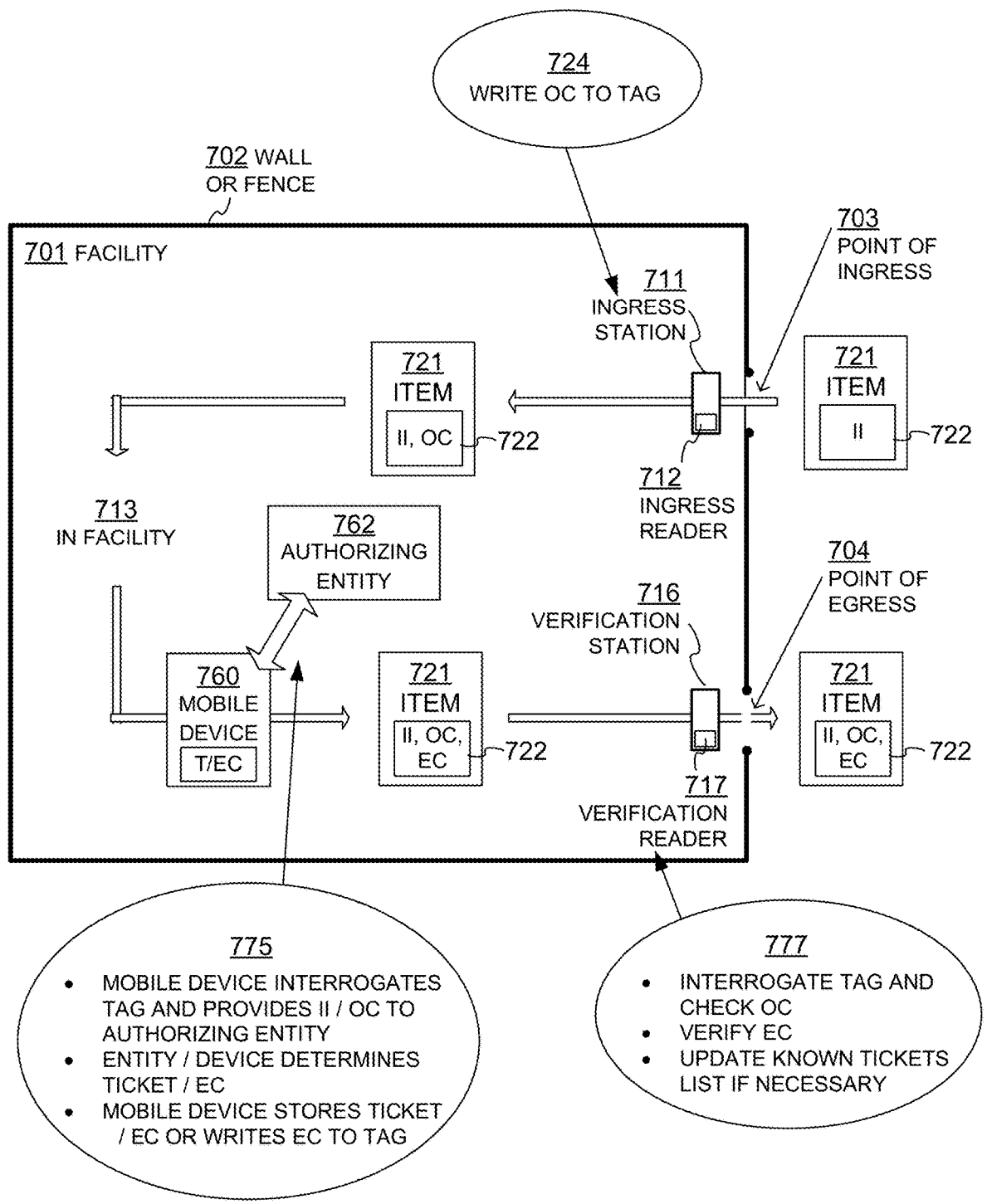

FIG. 7C is yet another conceptual diagram displaying authorization and exit verification. FIG. 7C is similar to FIGS. 7A and 7B, with similarly-numbered elements behaving similarly. Differently from FIGS. 7A and 7B, in FIG. 7C a mobile device 760 and an authorizing entity 762 authorize item 721 and attached tag 722 to leave facility 701. Mobile device 760 may be a mobile or smart phone, a portable reader, a laptop, a tablet, or other portable electronic device. Mobile device 760 may be associated with a facility employee or with an entity that will be removing item 721 and attached tag 722 from facility 701. The removing entity may be a customer or consumer, employee, authority, or any other suitable person or entity. Authorizing entity 762 is capable of authorizing the removal of items and tags from facility 701. Authorizing entity 762 may be an authorization station (e.g., authorization station 714), processor, or server located at facility 701 or at a remote location. Regardless of its location, authorizing entity 762 is capable of communicating with mobile device 760, for example via wired (Ethernet, USB, serial, etc.) or wireless (WiFi, Bluetooth, 2G/3G/4G, RF, etc.) signals.

At operation 775, mobile device 760 interrogates tag 722 to retrieve an II and an OC. The interrogation may be in response to an action indicating that tag 722 and its associated item are to be removed from facility 701. As example actions, a customer or employee associated with mobile device 760 may choose tag 722 and its associated item by bringing mobile device 760 into close proximity to tag 722, by scanning a label associated with tag 722, by searching for tag 722 using the mobile device, or by any other suitable action. Mobile device 760 then provides tag 722's II and OC to authorizing entity 762. In some embodiments, mobile device 760 may also provide authorizing information to authorizing entity 762, such as customer identification information (e.g., a customer account number or identifier) or payment information (e.g., payment authorization or proof-of-payment), as described above in FIG. 7A.

In some embodiments, authorizing entity 762 then selects a ticket and/or computes an EC and provides the ticket and/or EC to mobile device 760. In other embodiments, mobile device 760 may select or create the ticket and/or compute at least a part of the EC by itself, in some instances using information sent to mobile device 760 by authorizing entity 762 and in other instances by creating the ticket/EC and sending it to authorizing entity 762 for checking or registration. In some embodiments, mobile device 760 then writes the ticket/EC into tag 722 using a built-in or external reader. In other embodiments mobile device 760 may retain the ticket/EC itself, and provide the ticket/EC in lieu of tag 722 providing it when prompted by verification reader 717. Regardless of whether the ticket/EC is stored in tag 722 or mobile device 760, mobile device 760 may perform the storing in response to an action from the entity associated with mobile device 760.

At operation 777, verification reader 717 verifies the ticket or EC, as described above in FIGS. 7A and 7B, and updates a ticket list as necessary. If mobile device 760 stores the ticket/EC instead of tag 722 storing it, verification reader 717 may verify both the correct EC/ticket and whether mobile device 760 accompanies departing tag 722. If correct, verification reader 717 allows tag 722 to leave facility 701; otherwise, verification reader 717 may sound an alarm or otherwise notify authorities.

Figure 7D:
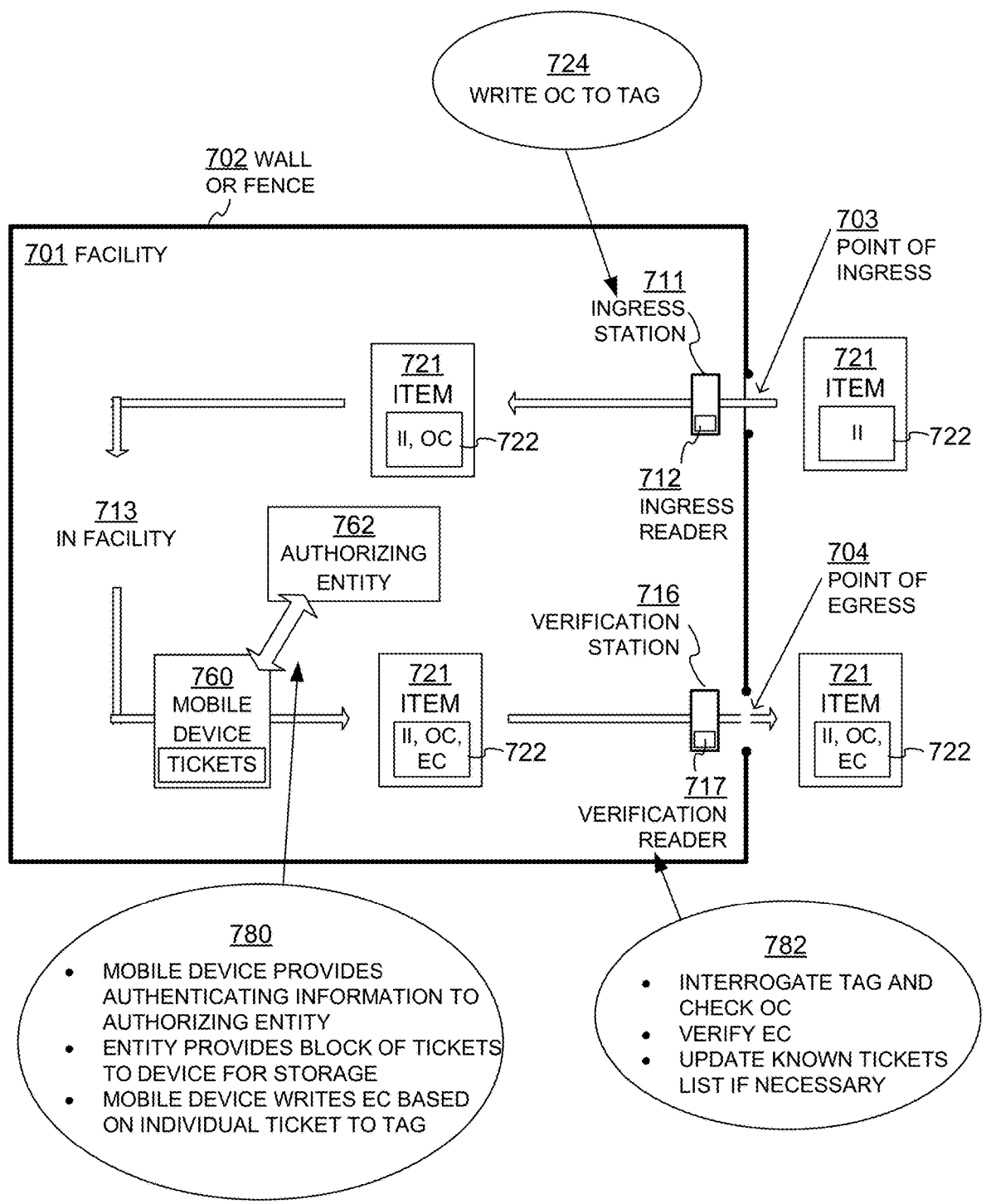

FIG. 7D is another conceptual diagram displaying authorization and exit verification. FIG. 7D is similar to FIG. 7C, with similarly-numbered elements behaving similarly. Unlike in FIG. 7C, in FIG. 7D authorizing entity 762 does not select a ticket or compute an EC based on tag 722's II. Instead, at operation 780 authorizing entity 762 provides, to mobile device 760, a block of one or more tickets that are independent of tag 722's II. In typical use cases the entity associated with mobile device 760 first provides some authorizing information (as described in FIG. 7A) to authorizing entity 762. The authorizing information may be provided by the entity via mobile device 760 or another suitable means (e.g., verbally, using another device, etc.). After verifying the authorizing information, authorizing entity 762 may provide the block of one or more tickets to the mobile device 760, which then stores the received tickets.

When the entity associated with mobile device 760 chooses to purchase or remove a tagged item, the entity uses mobile device 760 to write a received ticket, or an EC based on one or more of its received tickets, to the tag associated with the item. As a specific but non-limiting example, upon deciding to purchase item 721 a customer selects item 721 containing tag 722, at which point mobile device 760 writes an EC derived from a received ticket to tag 722. Mobile device 760 may derive the EC from the received ticket using any of the methods described above. Of course, mobile device 760 may write the EC to tag 722 when the customer selects item 721, at a later time such as when both are near the verification reader 717, or may associate the EC with item 721 within the mobile device and not write the EC to tag 721. The consumer or facility may choose one of the latter approaches to thwart an eavesdropper from intercepting the EC and writing it to an unauthorized tag. Subsequently, at operation 782 verification reader 717 verifies the EC, as described above in FIGS. 7B and 7C, updating a known ticket list if necessary.

Whereas in FIGS. 7A-D verification reader 717 authorizes tag 722 to leave facility 701 by verifying the tag's II, OC, and EC, in some embodiments verification reader 717 may be connected via a facility network or the Internet to a verification authority. The verification authority may be configured to perform one or more of the verification steps described above (e.g., verifying the EC, updating a ticket scratchlist, etc.). In this case, verification reader 717 may pass a tag II, OC, EC, and/or ticket to the verification authority for processing.

As described above, tickets are one-time-use codes that an authorization reader assigns to a tag to indicate to a verification reader that the tag is authorized to leave a facility. Tickets may be generated by a facility (e.g., facility 701), by a parent of the facility, by an organization associated with the facility, by a security agency or organization, or by any other suitable entity, and then distributed to authorization and verification readers. Because a verification reader determines whether a tag with an assigned ticket is authorized to leave the facility based, in part, on whether the ticket has been previously seen, the ticket generation may be configured to ensure that each ticket is substantially unique for at least a period of time. For example, tickets may be randomly-generated numbers; may be based on a particular tag or tag type, item or item type, or other identifier; may be based on information related to the authorization reader; or may be based on any other suitable data. New tickets may be generated periodically (e.g., every minute, hour, day, week, month, etc.) or dynamically (e.g., as needed). A particular ticket may be guaranteed to be unique (at least with respect to the facility) for a particular predefined or dynamic period of time (e.g., hours, days, weeks, months, etc.). Similarly, ticket distribution may be configured to ensure that different authorization readers or mobile devices do not inadvertently assign the same ticket to different tags.

Figure 8:
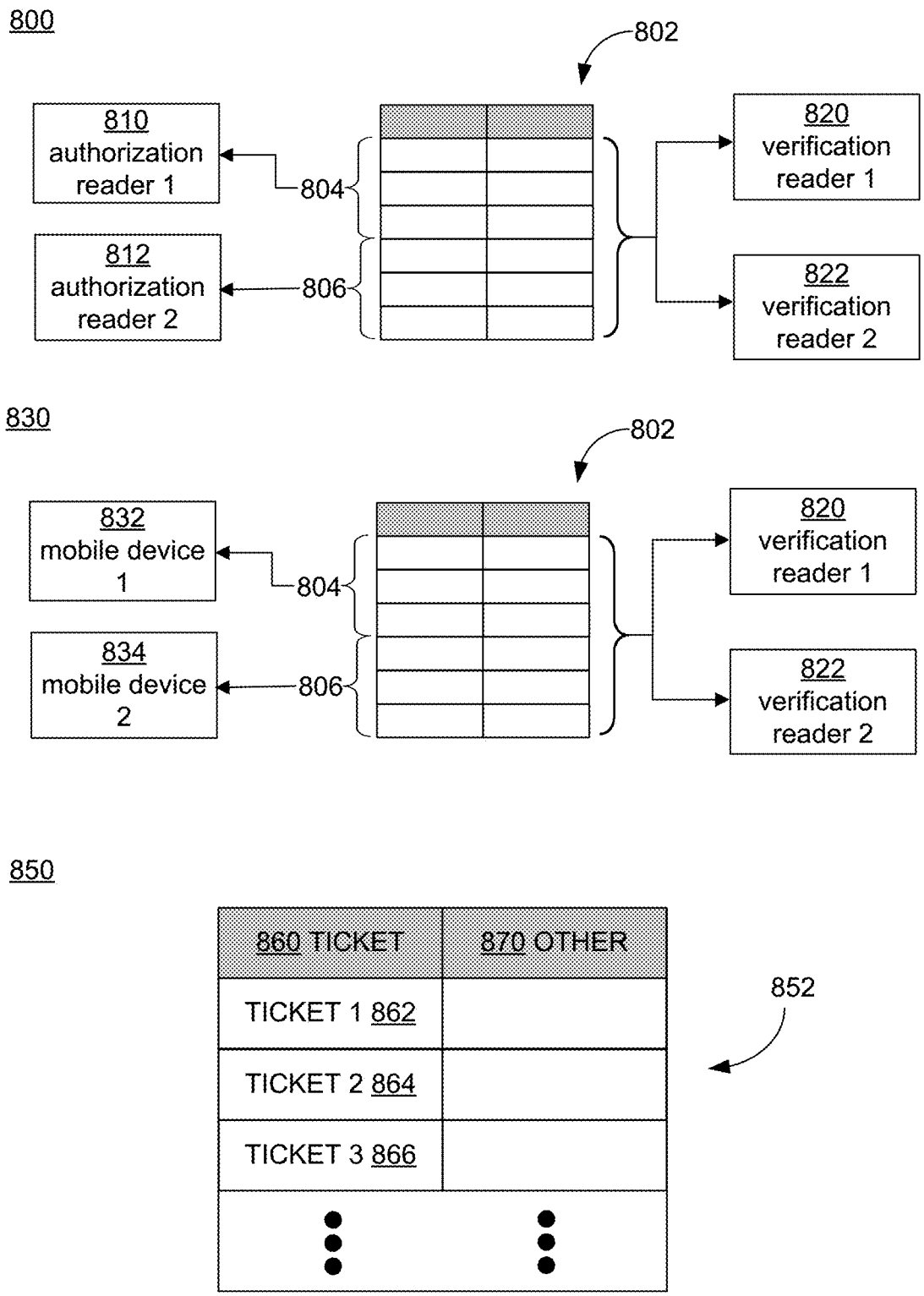
FIG. 8 illustrates how tickets may be distributed to authorization readers.

FIG. 8 illustrates how tickets may be distributed to authorization readers. An authorization reader may be an authorization terminal, such as a point-of-sale terminal or a kiosk, a mobile device capable of reading tags that is associated with the facility, a mobile device capable of reading tags that is associated with a customer or employee, a reader networked to an authorizing entity, or any other device configured to read tags and provide authorization. Diagram 800 depicts a ticket list 802, referred to herein as a "scratchlist". Scratchlist 802 includes multiple tickets, each different. To ensure that different authorization readers do not inadvertently assign the same ticket to different tags, scratchlist 802 (and its included tickets) is divided into several non-overlapping portions 804 and 806, each of which contain a different set of tickets and is provided to a different authorization reader. For example, in diagram 800 portion 804 is provided in box 810 to authorization reader 1, and portion 806 is provided in box 812 to authorization reader 2. In diagram 830 portion 804 is provided in box 832 to mobile device 1 and portion 806 is provided in box 834 to mobile device 2. If only a single authorization reader assigns tickets within a facility then scratchlist 802 need not be subdivided into portions, but if multiple devices assign tickets then partitioning scratchlist 802 provides a simple means to prevent assignment errors. Of course, the number of partitions will depend on the use case and will typically exceed two; here two portions are shown simply for ease of drawing. The size of each scratchlist portion may be equal or different, and in some cases may be based on the particular authorization readers or mobile devices to which the portions are being provided.

Whereas an authorization reader may receive a portion of scratchlist 802, a verification reader (e.g., verification reader 717) may receive the entire scratchlist 802, because the verification reader may see tags with tickets assigned by any of the authorization readers. If multiple verification readers exist at a facility, each verification reader may receive a copy of scratchlist 802.

In some embodiments, multiple authorization readers may select tickets from the same scratchlist portion, and may update the scratchlist in real-time to prevent other authorization readers from selecting the same ticket. In this case, the scratchlist may not be divided into portions. In some embodiments, a central controller may distribute tickets (or blocks of tickets) as needed, and may update the scratchlist as tickets are assigned.

In some embodiments, authorization readers may be provided with one or more ranges of ticket values to assign to tags instead of explicit ticket values. For example, an authorization reader may be provided a ticket value range in the form of a starting ticket value (e.g., ticket #1), an ending ticket value (e.g., ticket #101), and an increment value (e.g., increment by 1, 2, 3, or a dynamic value) within the range. The authorization reader may then choose which tickets to assign to tags based on the starting, increment, and ending values. For example, if an authorization reader is provided with a starting ticket value of 1, an ending ticket value of 10, and an increment value of 2, the device may assign ticket values 1, 3, 5, 7, and 9. In some embodiments, authorization readers may be provided with multiple ranges, and different authorization readers may be provided with different ranges. Verification readers may know the range(s) assigned to the authorization readers, and may be able to use the ranges to verify a ticket assigned to a tag.

Diagram 850 is a detailed depiction of a scratchlist 852. Scratchlist 852 may be similar to scratchlist 802 in diagram 800. Scratchlist 852 may be stored at an authorization reader, a verification reader, a central controller, or at another suitable location. Scratchlist 852 has multiple entries (rows), each entry corresponding to a particular ticket. Scratchlist 852 is depicted as having at least three tickets: ticket 1 862, ticket 2 864, and ticket 3 866. In other embodiments a scratchlist may have more or fewer tickets. Each ticket entry in scratchlist 852 may have a "ticket" field 810 and one or more optional other fields 870. Ticket field 810 stores ticket values, which may be created as described above. Optional other field(s) 870 may store other information associated with the ticket such as an associated tag or item, authorization reader, authorizing information, or other identifiers associated with a particular ticket including timestamps, comments, or any other suitable information, and in some embodiments may be used to help determine if an item is authorized to leave a facility.

When a verification reader verifies that a ticket assigned to an exiting tag is both present in its locally stored scratchlist and has not been previously used, the verification reader will typically store the tag's II but may also, or instead, store a timestamp, a location identifier, and/or identifiers associated with the verification reader, the tag, or the tag's attached item in field 870 associated with the ticket. Subsequently, if the verification reader encounters a tag with a previously used ticket then it may retrieve the tag's II or other information and compare it to the information stored in field 870. If the information matches then the verification reader may assume that the tag and associated item are re-entering or re-exiting the facility. If the information does not match then the verification reader may assume that the item is not authorized to leave the facility and may sound an alarm or otherwise notify authorities.

Figure 9:
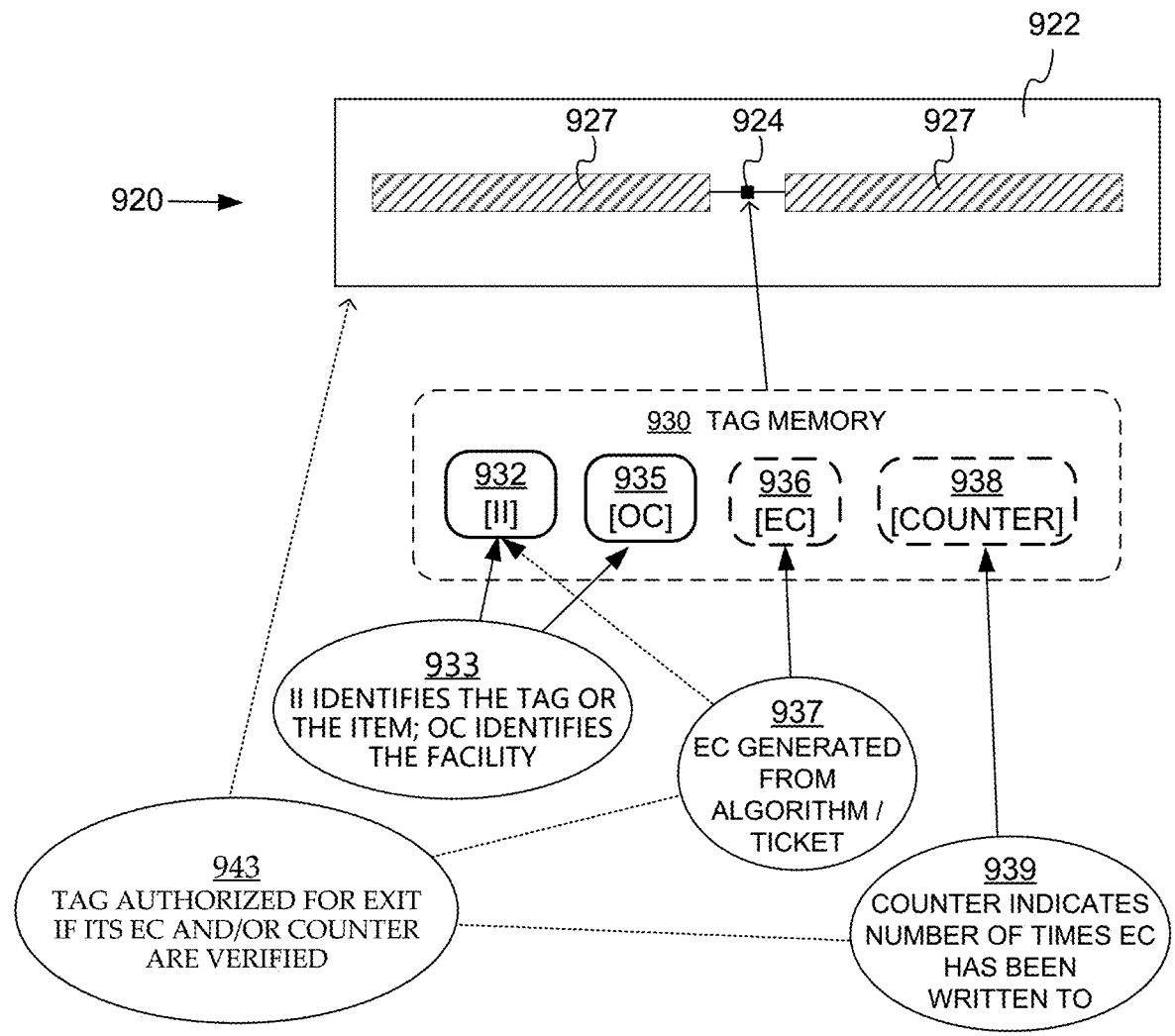
FIG. 9 illustrates major components of an RFID tag and how an item identifier, ownership code, exit code, and/or a counter are stored in a tag according to embodiments.

FIG. 9 illustrates an RFID tag 920 storing an II, OC, EC, and an optional counter in tag memory. As discussed previously, RFID tag 920 includes an IC 924 and antenna(s)

927 on inlay 922. IC 924 includes a tag memory 930. In a system according to embodiments, an II 932, OC 935, EC 936, and counter 938 may be stored in the same or different sections of tag memory 930.

As indicated by comment 933 and described previously, II 932 identifies the tag and/or the item to which the tag is attached, and OC the item's associated facility. As indicated by comment 937, EC 936 may be generated based on an algorithm with one or more inputs, such as a ticket, also described previously. Tag memory 930 may include counter 938, which as described in comment 939 indicates the number of times EC 936 has been written-to. "Written-to" means one or more of writing, overwriting, incrementing, decrementing, erasing, or otherwise altering. The functionality of counter 938 is described below, in reference to FIG. 12.

As indicated by comment 943, RFID tag 920 (and, by association, the item attached to tag 920) is authorized for removal from the facility if EC 936 and counter 938's value (if counter 938 is present), are verified. Verifying the EC may include using an algorithm, a ticket, and one or more inputs, as described above. Verifying counter 938's value may include using the counter value, the value relative to a terminal value, the value relative to EC 936, or other parameters as will be described below. Of course, as described above, if OC 935 of RFID tag 920 does not match the facility's OC, or if OC 935 does not exist, then RFID tag 920 (and, by association, the item attached to tag 920) may be considered not associated with the facility and therefore authorized for removal from the facility regardless of the EC. To inhibit the unauthorized removal of items, II 932 and OC 935 may be write-locked or permanently write-locked and thereby rendered unchangeable. According to some embodiments, EC 936 and/or counter 938 may be unlocked or permanently unlocked to facilitate erasure or overwriting for items returned to the facility. For example, a customer with a mobile device (e.g., mobile device 760) may purchase an item attached to tag 920, causing EC 936 to be stored on tag 920. Subsequently, the customer may decide to return the item, and the mobile device (or another device) may erase EC 936 from tag 920.

Figure 10:
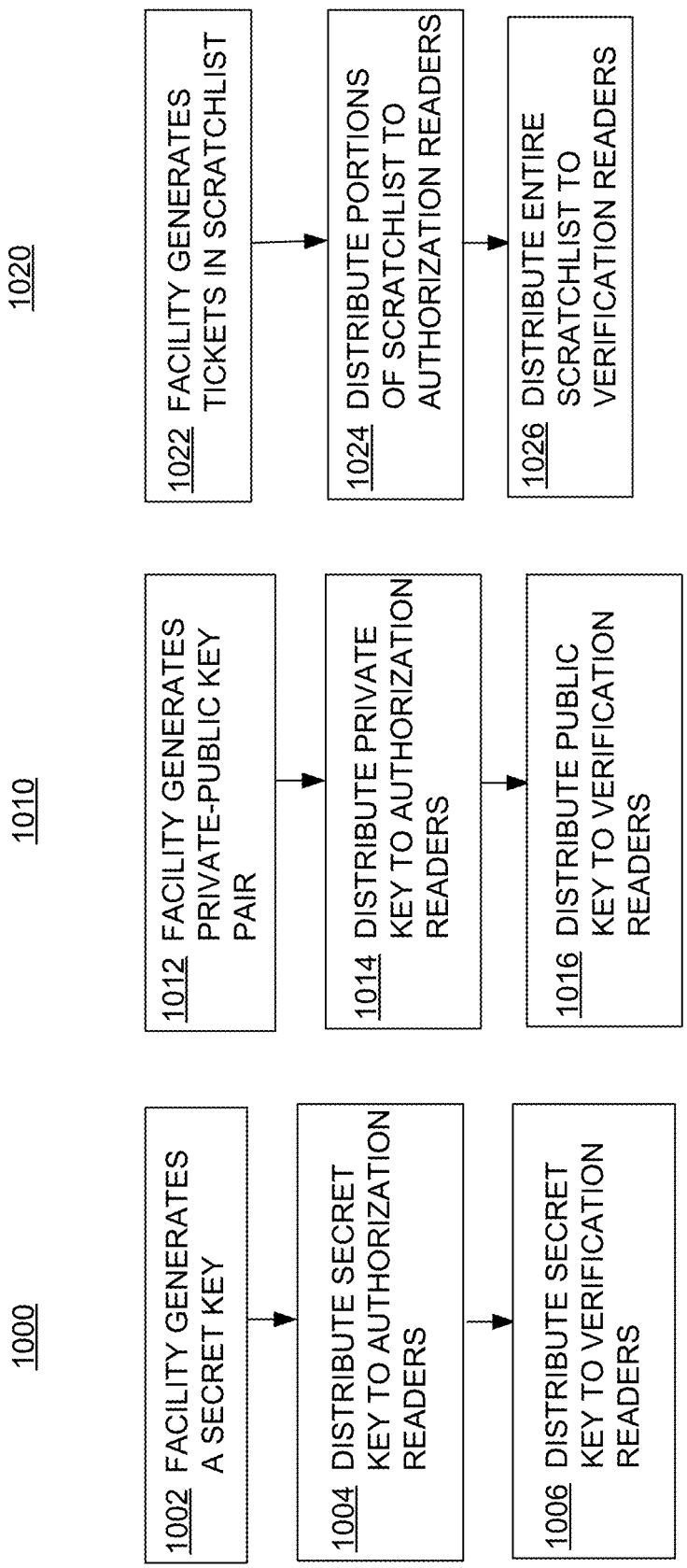
FIG. 10A is a flowchart for a process of generating and distributing secret keys.
FIG. 10B is a flowchart for a process of generating and distributing private-public key pairs.
FIG. 10C is a flowchart for a process of generating and distributing scratchlists and scratchlist portions.

FIGS. 10A, 10B, and 10C show flowcharts for generating and distributing keys and/or tickets to a facility's authorization and verification devices. This distribution permits authorization readers to provide ESs and tickets that authorize items to leave a facility, and verification devices to verify the ESs and/or tickets of the exiting items.

FIG. 10A is a flowchart for a process of generating and distributing secret keys, such as may be used for symmetric cryptosystems. Process 1000 begins at operation 1002 with the facility generating a secret key. The term "facility" as used herein is a generalization of the set of facility-related entities including the facility, a parent of the facility, an organization associated with the facility, a security agency or organization associated with the facility, a computer system associated with any of the above, or a related entity as will be well known to those skilled in the art. At operation 1004 the secret key is provided to authorization readers associated with the facility. At operation 1006 the secret key is provided to verification readers. The providing can be by a computer network such as network 480 of FIG. 4, or by any other means.

FIG. 10B is a flowchart for a process of generating and distributing public-private key pairs, such as may be used for asymmetric cryptosystems. Process 1010 begins at operation 1012 with the facility generating one or more public-private key pairs. At operation 1014 the private keys are distributed to authorization readers associated with the facility. In some embodiments, each authorization reader receives a private key from a different key pair. At operation 1016 the public keys corresponding to the private keys are provided to verification readers. The providing can be by a computer network such as network 480 of FIG. 4, or by any other means.

FIG. 10C is a flowchart for a process of generating and distributing scratchlist portions and entire scratchlists. Process 1020 begins at operation 1022 with a facility generating a scratchlist containing multiple tickets. At operation 1024 portions of the generated scratchlist are provided to authorization readers, which may be mobile devices as described above and/or authorization readers associated with the facility. At operation 1026 the entire scratchlist is provided to one or more verification readers, also as described above. The providing can be by a computer network such as network 480 of FIG. 4, or by any other means. In some embodiments, the facility may periodically generate and distribute new scratchlists containing new tickets, either on a schedule (e.g. every minute, hour, day, week, or at any suitable frequency) or dynamically (e.g. as needed). Dynamic ticket generation may be based on parameters such as ticket use rate, item exit rate, or any other suitable parameter. In some situations, tickets may remain unique for only a period of time, and authorization readers and verification readers may be configured to use or allow duplicate tickets after the period of time.

Figure 11:
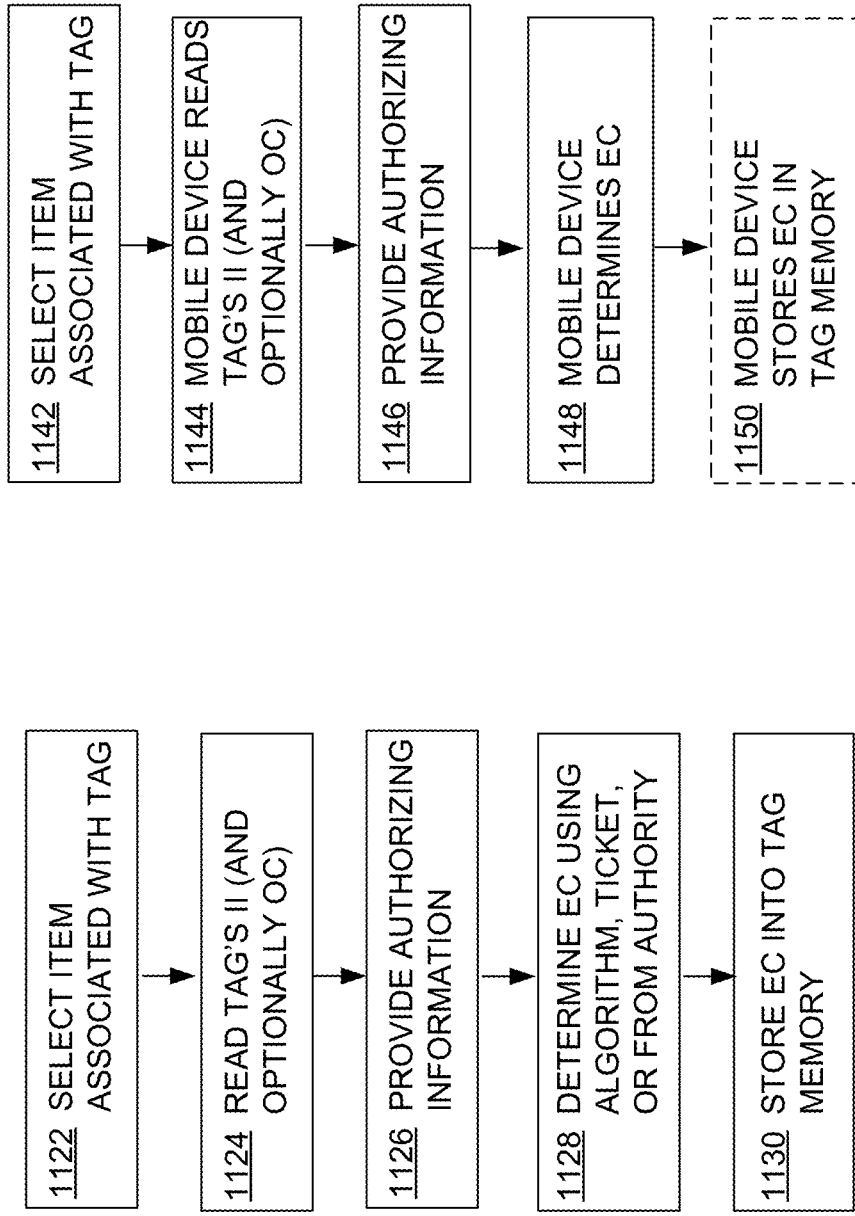
FIG. 11A is a flowchart for a process of providing an exit code for storage in tag memory.
FIG. 11B is a flowchart for a process of providing an exit code to a mobile device for storage either in the mobile device or in tag memory.

FIG. 11A is a flowchart for a process of providing an EC for storage in tag memory. Process 1120, which may be performed by an authorization reader, begins with operation 1122 in which an item associated with a tag is selected. The item may be selected by a customer, an employee, or some other entity who wishes to remove the item from the premises, and the selection may be performed by placing the item and an authorization reader in close proximity, a user input to the authorization reader causing it to select the item and its associated tag, or any other suitable selection action. At operation 1124, the authorization reader reads the tag's II and optionally its OC. If the OC is read and it does not match the facility's OC or does not exist then the tag may be considered foreign and the authorization reader may halt the EC provision process. If the OC does match the facility's OC, or if the OC is not read, at operation 1126 authorizing information (as described above in FIG. 7A) is provided to the authorization reader or an authorizing entity associated with the authorization reader. Upon verification of the authorizing information, at operation 1128 the authorization reader determines an EC for the tag and associated item. The authorization reader may determine the EC by generating or acquiring it (such as from a network) based on an algorithm and/or a ticket. The authorization reader may determine the EC by self-generating it, by receiving it from an authorizing entity or other remote entity, or by selecting it from a scratchlist portion stored at or otherwise accessible to the authorization reader. The EC may be based on an II, OC, secret key, and/or private key, derived from an algorithm, derived from a ticket, and/or be abridged, all as described above.

At operation 1130 the authorization reader stores the EC in tag memory. In some embodiments, if different authorization readers use different algorithms or different cryptographic keys then the authorization reader may also store information about its identity on the tag, so that a subsequent verification reader can determine the correct algorithm or key to use for verification. If the authorization reader generates the EC from a ticket then it may indicate to other authorization readers, verification readers, or a network that the ticket has been used.

FIG. 11B is a flowchart for a process of providing an EC to a mobile device for storage either in the mobile device or in tag memory. Process 1140 begins with operation 1142 in which an item associated with a tag is selected. The selection process is similar to operation 1122 except that the authorization reader is specifically a mobile device associated with a customer, employee, or other entity. At operation 1144, the mobile device reads the tag's II and optionally its OC, similar to operation 1124. At operation 1146 authorizing information is provided to the mobile device and/or to an authorizing entity, similar to operation 1126. Upon verification of the authorizing information, at operation 1148 the mobile device determines an EC, using any of the methods described above such as requesting the EC from a network or potentially self-generating at least part of the EC. In some embodiments, the mobile device may use the tag's II itself as the EC. At optional operation 1150, the mobile device stores the determined EC in tag memory. As described above, in some embodiments the mobile device may retain the EC itself without storing it into tag memory. For example, if the tag's II is used as the EC, the mobile device may store the II in its memory.

Embodiments as described herein include customer self-checkout from a retail store. Consider a first scenario in which a customer decides to purchase a tagged item. The customer uses his or her mobile device to read the tag's II and OC. The mobile device sends the II, OC, and a customer identifier or payment information to an authorizing entity. The authorizing entity debits the customer's account then provides an EC, or a portion of an EC, to the mobile device. The mobile device writes the EC to the tag. At the store exit a verification reader verifies the II, OC, and EC and allows the tagged item to leave the store.

Consider a second, similar self-checkout retail scenario. When a customer enters a retail store and provides payment information, an authorizing entity sends a block of tickets to the customer's mobile device. When the customer decides to purchase an item, he or she instructs the mobile device to write one of the tickets into the tag's memory. The customer may continue shopping, using additional tickets for each item that he or she wants to purchase. When the customer is finished shopping, he or she simply leaves the store. A verification reader at the store exit reads each tag's II, OC, and ticket, and sends the information to a store server. The store server then debits the customer's account for each item that exited the store. The store server determines the item type and price from the II, and ensures that the customer intended to purchase the item from the fact that the customer wrote a ticket into the item's tag. The verification reader may sound an alarm if an exiting tag does not contain a ticket. The store server only charges the customer for tags that contain the facility OC, and does not charge for foreign tags.

Consider a third self-checkout retail scenario. A customer enters a retail store and chooses items to purchase using a mobile device. The mobile device stores each item's II. When the customer is finished shopping, he or she simply leaves the store. A verification reader at the store exit reads each tag's II and OC. It queries the mobile device for the corresponding II, to confirm that the consumer intended to purchase each item. It also queries the mobile device for payment information. It then sends the IIs and payment information to a store server. The store server debits the customer's account for each item that exited the store. The verification reader may sound an alarm if an exiting tag's II is not in the mobile device, or if the customer's payment information is incorrect or invalid. The store server only charges the customer for tags that contain the facility OC, and does not charge for foreign tags. In this scenario, the II stored in the mobile device is a surrogate for a ticket.

For each of the above scenarios, customer returns are easy, because the EC (in the first scenario), ticket (in the second scenario), and surrogate ticket in the mobile device, are proof-of-purchase. When the customer returns the item the store verifies the EC or ticket, refunds the charge, erases the EC or ticket from the tag and/or from the store server, and places the item back on the shelf.

Of course, the above self-checkout scenarios are only three of the many that are possible using the embodiments and teachings described herein.

Consider again the first self-checkout scenario, in which the customer obtains and write an EC into an item's tag at time-of-purchase. Suppose the customer, still in the retail store, has a change of heart and decides not to purchase an item after all. The customer may use his or her mobile device to contact the authorizing entity and reverse the charge, but the customer still possesses a valid EC authorizing the tag and its associated item to leave the facility. If the store's verification readers are connected to the authorizing entity (e.g., via a network) then the authorizing entity can invalidate the EC and send the invalidation to the verification readers, which can alarm on tags with the now-invalid EC leaving the store. However, suppose that the verification readers are not connected to the authorizing entity, or that the store is so large that updating the verification readers in near-real-time is not possible. In this case, a tagged item with an invalid EC could leave the store without sounding an alarm. To address this issue, in some embodiments a tag may implement a counter that, combined with the EC, assists in tracking whether the item is authorized to leave the store.

Figure 12:
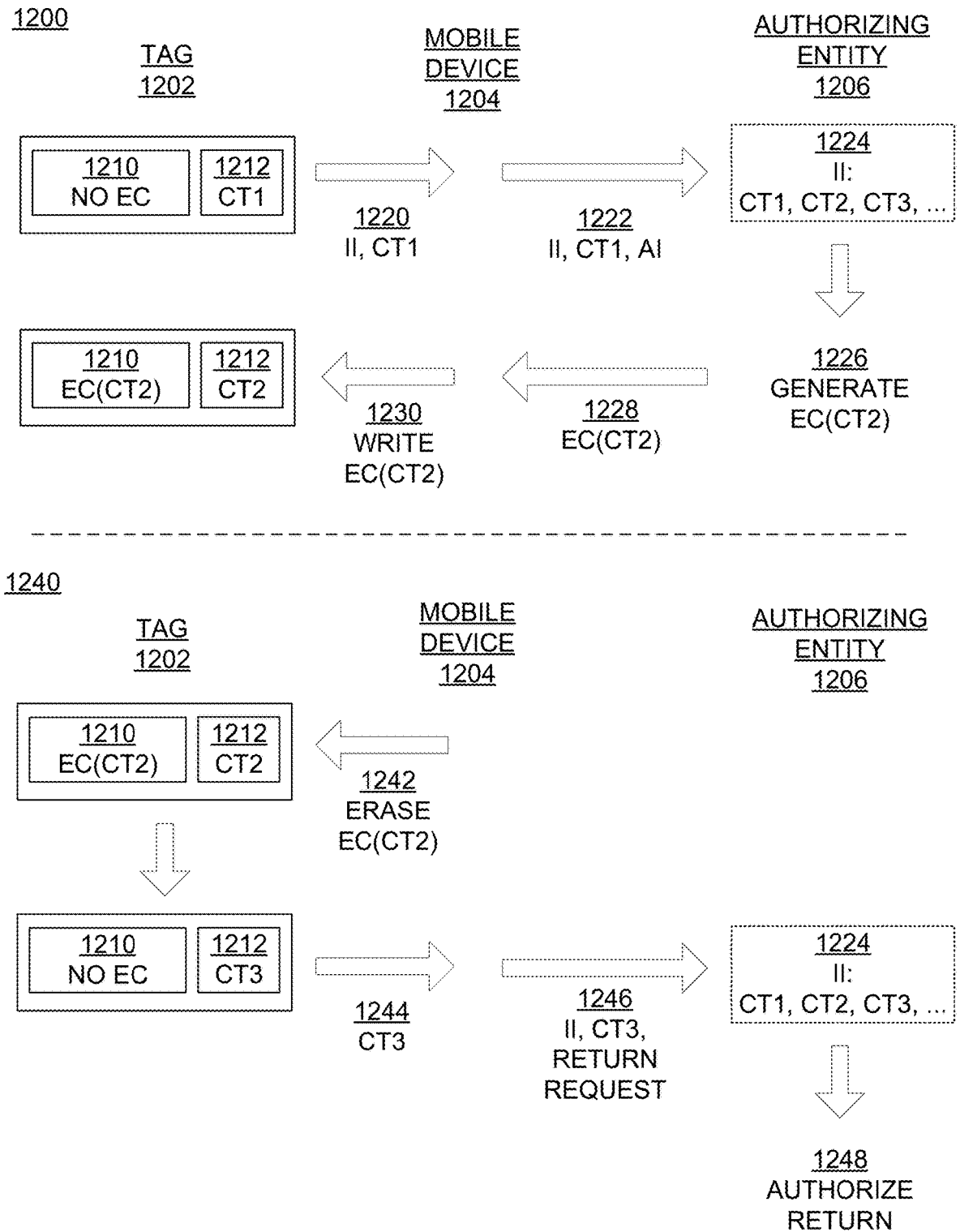
FIG. 12 depicts diagrams for providing and revoking authorization for a tag with a counter.

FIG. 12 depicts diagrams 1200 and 1240 for providing and revoking authorizations. In diagram 1200, mobile device 1204 obtains authorization for tag 1202 initially without an EC in memory location 1210 and with a first counter value CT1 in counter location 1212 to leave a facility. Counter 1212 is readable but not writeable by a reader, and increments every time memory portion 1210 is modified. In addition, counter 1212 is configured to increment in a manner known to an authorizing entity but not known to other entities. For example, counter 1212 may increment based on a pseudorandom number generator whose seed is known to authorizing entity 1206, or it may increment in a predictable fashion but with each counter value serving as a pointer to a table of seemingly random numbers stored on tag 1202. In the latter case, the table is not readable by a reader, and tag 1202 is configured to expose only the number indicated by the current counter value.

Diagram 1200 depicts tag 1202 being authorized to leave a facility. At operation 1220 mobile device 1204 read the tag's II and counter value CT1. At operation 1222, mobile device 1204 sends the II, CT1, and authorizing information AI to authorizing entity 1206. At operation 1224, authorizing entity 1206 uses the II to determine the increment values associated with counter 1212. These increment values, shown as CT2 and CT3 in diagrams 1200 and 1240, are known to authorizing entity 1206 but not to mobile device 1204.

Upon verifying the AI provided, at operation 1226, authorizing entity 1206 uses the determined next counter value, CT2, to generate exit code EC(CT2). If authorizing entity 1206 had received counter value CT2 at operation 1222 then it would have used CT3 to generate exit code EC(CT3).

Authorizing entity 1206 will typically generate EC(CT2) using at least a portion of CT2, or at least a portion of CT2 and other data such as the II and/or a random number, as inputs to an algorithm. The algorithm can be any of those described above in connection with generating an EC. In some embodiments, authorizing entity 1206 may track the values of counter 1212 over time, and may refuse to generate an EC if the received counter value does not match the expected counter value.

At operation 1228, authorizing entity 1206 provides EC(CT2) to mobile device 1204, which writes EC(CT2) to tag memory portion 1210 at operation 1230. The write operation causes counter 1212 to increment to CT2. A verification reader that subsequently observes tag 1202 may be configured to compare EC(CT2) to the current value of counter 1212. If the two correspond (e.g., EC(CT2) and CT2) then verification reader may conclude that tag 1202 is authorized to leave the facility. If the two do not correspond then the verification reader may conclude that tag 1202 is not authorized to leave the facility and may sound an alarm.

Diagram 1240 depicts revoking tag 1202's exit authorization, needed if a consumer chooses not to purchase a previously selected item. At operation 1242 mobile device 1204 erases EC(CT2) stored in tag memory portion 1210. The erase operation causes tag 1202 to increment counter 1212 to CT3. At operation 1244 mobile device 1204 reads CT3 from counter 1212. At operation 1246 mobile device 1204 sends CT3, the tag's II, and a return request to authorizing entity 1206, which verifies that CT3 is the correct next value for counter 1212 and in response authorizes the return request at operation 1248. If the provided CT3 is incorrect then the authorizing entity may choose to deny the return and take other action such as notifying store security or other authorities.

Figure 13:
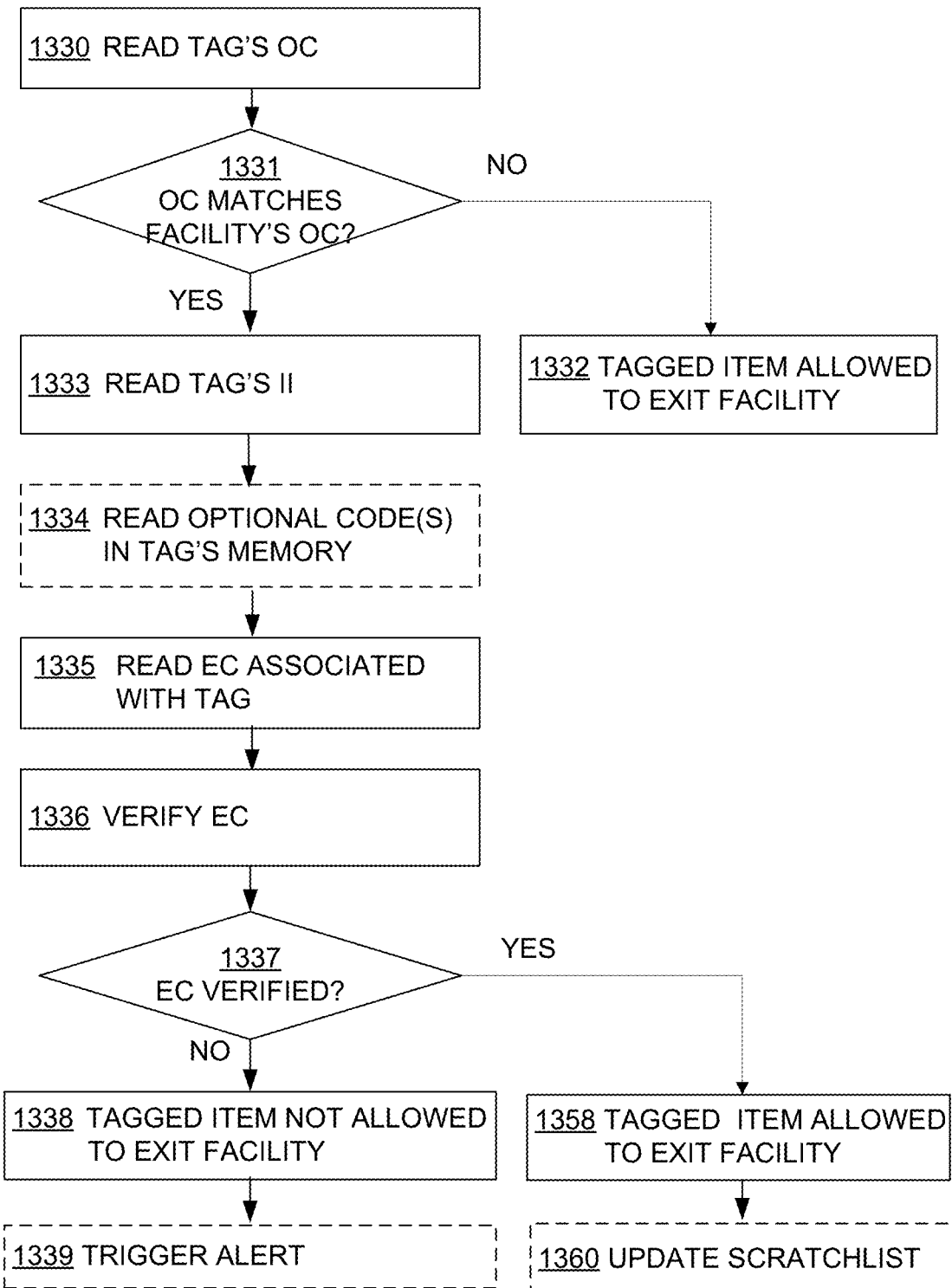
FIG. 13 is a flowchart illustrating a verification process for an RFID-based loss-prevention system.

FIG. 13 is a flowchart illustrating a verification process 1300 for an RFID-based loss-prevention system. Process 1300 may be implemented by a verification reader.

Process 1300 begins with operation 1330, where the reader reads a tag's OC. As will be described below, in some embodiments the tag's II may function as a surrogate OC, in which case the reader reads the tag's II and uses it as the OC. At decision operation 1331 the reader determines whether the tag's OC matches the facility's OC. If the tag's OC does not match the facility's OC or does not exist then the tagged item is allowed to leave the facility at operation 1332. If the tag's OC matches the facility's OC then the reader reads the tag's II at operation 1333, and may read optional code(s) such as tag feature information, a timestamp, a counter value, or other information as described above at optional operation 1334. At operation 1335 the reader reads an EC associated with the tag. The EC may be stored on the tag or on a mobile device associated with the tag. In some embodiments as described above, the tag's II may function as an EC, and a mobile device may store the tag's II.

At operation 1336 the reader verifies the EC, which may be a ticket or may be computed based on an algorithm and/or a ticket, and may contain an ES, all described above. The verification may involve a table lookup, a comparison, an encryption, a decryption, a recomputation using known inputs, a reverse computation from the EC, a counter-value check, a scratchlist check, an "already seen" check, or any of the other methodologies described above. The reader may read a key or authorization-reader identifier to determine the correct algorithm or key to use to verify the EC, or may iterate through its known algorithms or keys to verify the EC.

In some embodiments the verification reader may connect to a verification authority configured to perform one or more of the steps in the verification process, such as verifying the EC, updating a ticket scratchlist, etc. If so, the verification reader may have the verification authority perform some or all of the verification steps.

At decision operation 1337, if the verification fails then at operation 1338 the tagged item is not allowed to leave the facility. As described above, one method for preventing an item with an unverified EC from leaving a facility is by triggering an alert or alarm, such as at optional operation 1339. If the verification succeeds then at operation 1358 the tagged item is allowed to leave the facility. If the verification succeeds and the EC is or is based on a ticket then at optional operation 1360 the reader may update its scratchlist, as described above in FIG. 8. In some embodiments, if multiple verification readers exist (typically at multiple facility exits) then the reader may synchronize its updated scratchlist with other readers.

Process 1300 also applies in situations where the EC and/or the ticket is stored in a mobile device as described above in FIG. 7C and FIG. 11C. However, instead of reading the EC from the tag, the reader reads the EC and/or the ticket from the mobile device. In some embodiments, a particular EC or ticket may be associated with and authorize multiple tags (and attached items) to be removed from the facility.

In some embodiments the verification operation 1336 involves the provision of authorizing information. For example, a mobile device may store a tag's II and use the II as an EC. Upon determining that the mobile device stores the II, the verification reader may request authorizing information from the mobile device. The authorizing information may then be verified at the verification reader or by a separate authorizing or verification entity connected to the verification reader.

The operations described in processes 1000, 1010, 1020, 1120, 1140, and 1300 are for illustration purposes only. An RFID-based loss-prevention system and its operations may be implemented employing additional or fewer operations and in different orders using the principles described herein. For example, although reader operations are described herein as proceeding serially, those skilled in the art will recognize that in any deployed RFID system one or more of these operations may be merged (for example, the authorization reader may read the tag's II, OC, EC, and an optional counter value all at once).

Whereas in the above embodiments tags store OCs indicating an associated organization or facility, in other embodiments tags may not store OCs, particularly in applications that do not expect to see foreign tags. If the tags do not store OCs then EC generation and tag verification will not involve OCs.

In some embodiments, a facility may store the II of all tags associated with the facility. When a verification reader checks if a particular tag is authorized to leave the facility, it may check the II as a surrogate for the OC. For example, instead of reading a tag's OC and checking to see if the tag's OC matches the facility's OC as described at operations 1330 and 1331 of process 1300, a verification reader may read an II and check to see if the II is associated with the facility. In such embodiments, the tag need not store a separate OC because the II behaves as both an II and an OC.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A loss-prevention system comprising:
   a first Radio Frequency Identification (RFID) reader configured to write a computed code to an RFID tag authorizing an item associated with the RFID tag to be removed from a facility; and
   a second RFID reader configured to:
      determine that the RFID tag and its associated item are being removed from the facility;
      determine that the RFID tag and its associated item require authorization to be removed from the facility;
      receive the computed code and an item identifier from the RFID tag;
      determine that the computed code is correctly based on the item identifier; and
      in response, allow the RFID tag and its associated item to be removed from the facility.

2. The loss-prevention system of claim 1, wherein the computed code is computed based on the item identifier and one or more of a tag identifier, an owner code, a temporal parameter, and a reader identifier.

3. The loss-prevention system of claim 1, wherein the second RFID reader is configured to determine that the RFID tag and its associated item are being removed from the facility by determining that the RFID tag is near an exit of the facility.

4. The loss-prevention system of claim 1, wherein the second RFID reader is configured to determine that the RFID tag and its associated item require authorization to be removed from the facility based on one or more of the item identifier and an owner code received from the RFID tag.

5. The loss-prevention system of claim 1, wherein the second RFID reader is configured to determine that the computed code is correctly based on the item identifier by:
   sending the computed code and the item identifier to a verification authority, and
   receiving a response from the verification authority indicating that the computed code is correctly based on the item identifier.

6. The loss-prevention system of claim 1, wherein the second RFID reader is configured to use an algorithm to determine that the computed code is correctly based on the item identifier.

7. A Radio Frequency Identification (RFID) reader system configured for loss prevention at a facility, the system comprising:
   an RFID reader module configured to communicate with an RFID tag associated with an item; and
   a controller coupled to the RFID reader module and configured to:
      receive, via the RFID reader module, an item identifier and a code from the RFID tag;
      determine that the RFID tag and its associated item are being removed from the facility;
      upon receiving the code, determine whether the code is correctly associated with at least the item identifier; and
      upon determining that the code is correctly associated with at least the item identifier, allow the RFID tag and its associated item to be removed from the facility.

8. The RFID reader system of claim 7, wherein the controller is further configured to determine whether the code is correctly associated with the item identifier and one or more of a tag identifier, an owner code, a temporal parameter, and a reader identifier.

9. The RFID reader system of claim 7, wherein the controller is configured to determine that the RFID tag and its associated item are being removed from the facility by determining that the RFID tag is near an exit of the facility.

10. The RFID reader of claim 7, wherein the controller is further configured to determine that the item requires authorization to be removed from the facility based on one or more of the identifier and an owner code received from the RFID tag.

11. The RFID reader system of claim 7, wherein the controller is configured to determine whether the code is correctly associated with at least the item identifier by one of:
   determining whether the code was computed based on at least the item identifier and an algorithm; and
   determining whether the code was assigned to the RFID tag.

12. The RFID reader system of claim 7, wherein the controller is configured to determine whether the code is correctly associated with at least the item identifier by:
   sending the computed code and the item identifier to a verification authority, and
   receiving an response from the verification authority indicating whether the code is correctly associated with at least the item identifier.

13. The RFID reader system of claim 7, wherein the controller is further configured to, upon determining that the code is incorrectly based on at least the item identifier, sound an alarm or provide a notification.

14. A method for providing a Radio Frequency Identification (RFID) based loss-prevention system at a facility, the method comprising:
   writing a code to an RFID tag authorizing an item associated with the RFID tag to be removed from the facility;
   determining that the RFID tag is being removed from the facility;
   determining that the item requires authorization to be removed from the facility;
   receiving the code and an identifier from the RFID tag;
   determining whether the code is correctly associated with the item; and
   if the code is correctly associated with the item, then allowing the RFID tag and the item to be removed from the facility.

15. The method of claim 14, further comprising generating the code based on one or more of an item identifier, a tag identifier, an owner code, a temporal parameter, and a reader identifier.

16. The method of claim 14, further comprising determining that the RFID tag is being removed from the facility by determining that the RFID tag is near an exit of the facility.

17. The method of claim 14, further comprising determining that the item requires authorization to be removed from the facility based on one or more of the identifier and an owner code received from the RFID tag.

18. The method of claim 14, wherein determining whether the code is correctly associated with the item comprises one of:
   determining whether the code was computed based on at least the item identifier and an algorithm, and
   determining whether the code was assigned to the RFID tag.

19. The method of claim 14, wherein determining whether the code is correctly associated with the item comprises:
   sending the code and the item identifier to a verification authority, and
   receiving a response from the verification authority indicating whether the code is correctly associated with the item.

20. The method of claim 14, further comprising, if the code is incorrectly associated with the item, sounding an alarm or providing a notification.

* * * * *

UNITED STATES PATENT AND TRADEMARK OFFICE
CERTIFICATE OF CORRECTION

PATENT NO. : 10,916,114 B1
APPLICATION NO. : 16/826470
DATED : February 9, 2021
INVENTOR(S) : Christopher J. Diorio et al.

Page 1 of 1

It is certified that error appears in the above-identified patent and that said Letters Patent is hereby corrected as shown below:

In the Specification

In Column 4, Line 2, Delete "signals)" and insert -- signals). --, therefor.

In Column 14, Line 47, Delete "that that" and insert -- that --, therefor.

In Column 21, Line 64, Delete "Hs" and insert -- IIs --, therefor.

In Column 25, Line 14, Delete "and or" and insert -- and/or --, therefor.

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*